(12) United States Patent
Uetake et al.

(10) Patent No.: US 10,538,897 B2
(45) Date of Patent: Jan. 21, 2020

(54) EXCAVATION MACHINE, METHOD FOR CONTROLLING EXCAVATION MACHINE, AND EXCAVATION SYSTEM

(71) Applicants: Komatsu Ltd., Tokyo (JP); The University of Tokyo, Tokyo (JP)

(72) Inventors: Masaaki Uetake, Tokyo (JP); Nobuki Hasegawa, Tokyo (JP); Kazunari Kawai, Tokyo (JP); Taito Fujita, Tokyo (JP); Yuichi Kodama, Tokyo (JP); Rui Fukui, Tokyo (JP); Takayoshi Niho, Tokyo (JP)

(73) Assignee: KOMATSU LTD., Tokyo (JP)

( * ) Notice: Subject to any disclaimer, the term of this patent is extended or adjusted under 35 U.S.C. 154(b) by 260 days.

(21) Appl. No.: 15/542,183

(22) PCT Filed: Jan. 8, 2016

(86) PCT No.: PCT/JP2016/050568
§ 371 (c)(1),
(2) Date: Jul. 7, 2017

(87) PCT Pub. No.: WO2016/114240
PCT Pub. Date: Jul. 21, 2016

(65) Prior Publication Data
US 2018/0258608 A1    Sep. 13, 2018

(30) Foreign Application Priority Data
Jan. 13, 2015   (JP) .................................. 2015-004358

(51) Int. Cl.
*E02F 3/43*    (2006.01)
*E02F 3/32*    (2006.01)
(Continued)

(52) U.S. Cl.
CPC ................ *E02F 3/435* (2013.01); *B65G 1/00* (2013.01); *B65G 15/00* (2013.01); *E02F 3/32* (2013.01);
(Continued)

(58) Field of Classification Search
None
See application file for complete search history.

(56) References Cited

U.S. PATENT DOCUMENTS

| | | |
|---|---|---|
| 5,875,854 A | 3/1999 | Yamamoto et al. |
| 6,247,538 B1 | 6/2001 | Takeda et al. |

(Continued)

FOREIGN PATENT DOCUMENTS

| | | |
|---|---|---|
| DE | 102 30 766 A1 | 1/2004 |
| JP | 09-195321 | 7/1997 |

(Continued)

OTHER PUBLICATIONS

International Search Report dated Apr. 5, 2016, issued for PCT/JP2016/050568.
(Continued)

*Primary Examiner* — Thomas G Black
*Assistant Examiner* — Demetra R Smith-Stewart
(74) *Attorney, Agent, or Firm* — Locke Lord LLP

(57) ABSTRACT

An excavation machine includes a detector detecting a state of an object to be excavated, a storage storing a plurality of pieces of excavation information in which a state of a first portion before excavated by a learning excavation device, and a first operation of when the learning excavation device excavates the first portion are associated with each other, and a processor including an estimation unit obtaining a state of a second portion intended to be excavated, the state having been detected by the detector, an operation determining unit selecting the state of the first portion corresponding to the state of the obtained second portion, from among the states of the first portions of the excavation information, and determining the first operation corresponding to the selected state, as a second operation of when excavating the second portion, and an excavation controller operating an excavation device with the second operation.

14 Claims, 26 Drawing Sheets

(51) Int. Cl.
*E02F 9/20* (2006.01)
*B65G 1/00* (2006.01)
*E21C 27/30* (2006.01)
*E02F 9/26* (2006.01)
*B65G 15/00* (2006.01)
*E02F 7/02* (2006.01)

(52) U.S. Cl.
CPC ............ *E02F 9/2004* (2013.01); *E02F 9/205* (2013.01); *E02F 9/2025* (2013.01); *E02F 9/262* (2013.01); *E21C 27/30* (2013.01); *E02F 7/026* (2013.01)

(56) References Cited

U.S. PATENT DOCUMENTS

| | | | |
|---|---|---|---|
| 6,317,669 | B1 | 11/2001 | Kurenuma et al. |
| 2010/0070905 | A1* | 3/2010 | Mizumori ............... C04B 28/02 715/772 |
| 2013/0200680 | A1* | 8/2013 | Cho ...................... E21D 9/1066 299/1.4 |
| 2014/0088838 | A1* | 3/2014 | Furem .................... B65G 67/04 701/50 |
| 2015/0043787 | A1* | 2/2015 | Fredrich ............. G06F 17/5018 382/109 |
| 2016/0048783 | A1* | 2/2016 | Peterson .......... G06Q 10/06311 705/7.13 |
| 2016/0244950 | A1* | 8/2016 | Kami .................... E02F 9/2033 |
| 2016/0251836 | A1* | 9/2016 | Baba ...................... E02F 3/435 701/50 |

FOREIGN PATENT DOCUMENTS

| | | |
|---|---|---|
| JP | 10-088625 A | 4/1998 |
| JP | 10-317418 A | 12/1998 |
| JP | 2002-129600 A | 5/2002 |
| JP | 2006-205343 A | 8/2006 |
| JP | 2013-180369 A | 9/2013 |
| JP | 2014-095644 A | 5/2014 |
| WO | 2006/028938 A1 | 3/2006 |

OTHER PUBLICATIONS

Supplementary European Search Report dated Aug. 2, 2018, issued for the European patent application No. 16737311.7.

\* cited by examiner

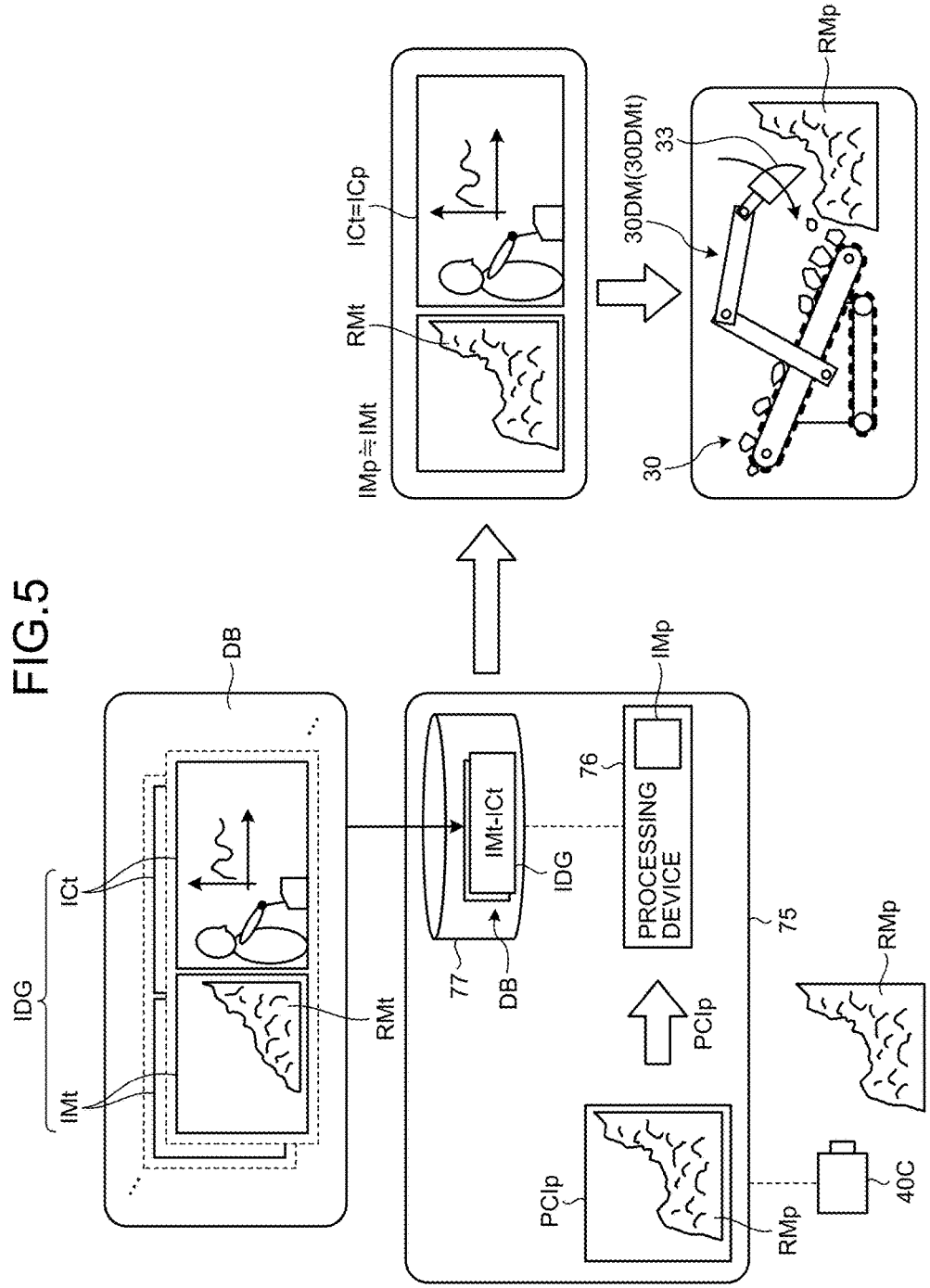

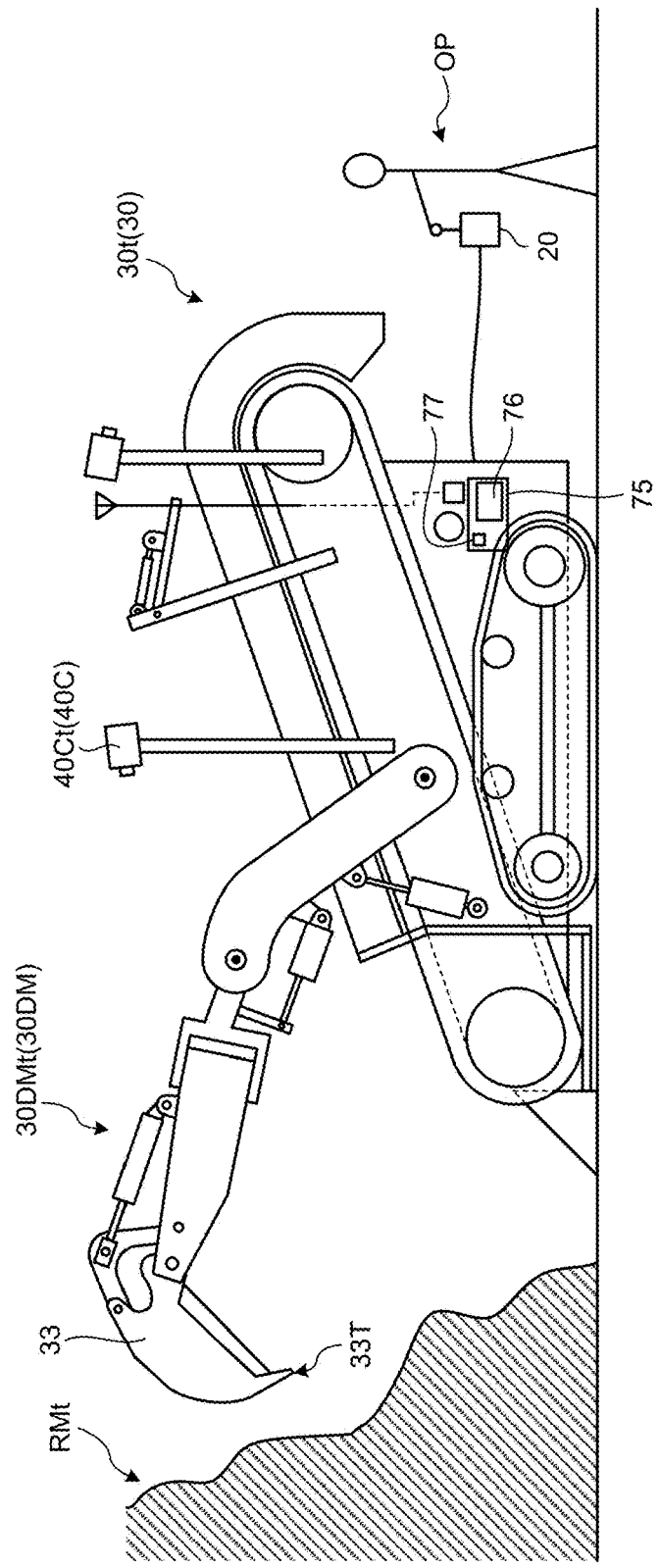

FIG.9

| EG | EQ | EV |
|----|----|----|
| EGA | EQA | EVA |
| EGB | EQB | EVB |

FTA

FTB

EXCAVATION MACHINE, METHOD FOR CONTROLLING EXCAVATION MACHINE, AND EXCAVATION SYSTEM

FIELD

The present invention relates to an excavation machine that excavates an object, a method of controlling an excavation machine, and an excavation system.

BACKGROUND

Excavation machines that excavate a rock mass, a ground, or the like are known. Patent Literature 1 describes, in an excavator that is one type of the excavation machines, selecting an instructed operation, of operation modes, when a site is changed and a ground plane of the excavator is changed, to instruct the operation of the excavator according to the site, and performing an automatic operation of the excavator, corresponding to the change of the site.

CITATION LIST

Patent Literature

Patent Literature 1: Japanese Patent Application Laid-open No. 9-195321

SUMMARY

Technical Problem

The technology described in Patent Literature 1 corresponds to a case in which the site is changed and the ground plane is changed of the excavator. However, Patent Literature 1 has no description and suggestion about automatic excavation when a state of a portion to be excavated by the excavator as an excavation machine is changed from hour to hour, and has room for improvement.

An objective of the present invention is to provide an excavation machine that can perform automatic excavation even when a state of a portion to be excavated by the excavation machine is changed from hour to hour.

Solution to Problem

According to the present invention, an excavation machine comprises: an excavation device provided with an excavation work tool; a detection device that detects a state of an object to be excavated by the excavation device; a storage device that stores a plurality of pieces of excavation information in which a state of a first portion that is a portion before excavated by a learning excavation device, and a first operation of when the learning excavation device excavates the first portion are associated with each other; and a processing device including an estimation unit that obtains a state of a second portion that is a portion intended to be excavated by the excavation device, the state having been detected by the detection device, an operation determining unit that selects the state of the first portion corresponding to the state of the second portion obtained by the estimation unit, from among the states of the first portions of the plurality of pieces of excavation information, and determines the first operation corresponding to the selected state, as a second operation of when the excavation device excavates the second portion, and an excavation control unit that operates the excavation device with the second operation determined by the operation determining unit.

In the present invention, it is preferable that the operation determining unit refers to the excavation information, and selects the state of the first portion on the basis of a degree of similarity to the state of the second portion obtained by the estimation unit.

In the present invention, it is preferable that the operation determining unit refers to the excavation information, selects the states of the plurality of first portions on the basis of a degree of similarity to the state of the second portion obtained by the estimation unit, and determines the second operation, using the plurality of first operations corresponding to the respective selected states of the first portions.

In the present invention, it is preferable that the processing device stores, to the storage device, evaluation information for evaluating an excavation state of when the excavation device is operated with the second operation determined by the operation determining unit to perform excavation, in association with the excavation information including the first operation corresponding to the second operation.

In the present invention, it is preferable that the processing device stores, to the storage device, the determined second operation together with the second portion.

In the present invention, it is preferable that the object to be excavated by the excavation device is a rock mass including rock, and the state of the first portion and the state of the second portion included in the excavation information include at least one of information of particle size distribution of the rock, information of a shape of the rock mass, information of a color of the rock mass, and information of humidity of the rock mass.

In the present invention, it is preferable that the information of particle size distribution of the rock includes at least one of a quantity of edges extracted from an image of the first portion or the second portion imaged by an imaging device, and a ratio of variation of the quantity of edges to variation of a size of a structural element, the ratio having been obtained by changing the size of the structural element used in processing before the edge is extracted, and the information of a shape of the rock mass includes a distance between the imaging device and the rock mass.

In the present invention, it is preferable that the first operation is an operation of when an operator operates the excavation device to perform excavation.

According to the present invention, a method of controlling an excavation machine, the method comprises: in controlling an excavation machine including an excavation device and a detection device that detects a state of an object to be excavated by the excavation device, generating a plurality of pieces of excavation information in which a state of a first portion that is a portion before excavated by a learning excavation device, and a first operation of when the learning excavation device excavates the first portion are associated with each other; obtaining a state of a second portion that is a portion intended to be excavated by the excavation device; selecting the state of the first portion on the basis of a degree of similarity to the state of the second portion, from among the states of the first portions of the plurality of pieces of excavation information, and determining the first operation corresponding to the selected state, as a second operation of when the excavation device excavates the second portion; and operating the excavation device with the determined second operation.

In the present invention, it is preferable that the object to be excavated by the excavation device is a rock mass including rock, and the state of the first portion and the state of the second portion included in the excavation information include at least one of information of particle size distribution of the rock, information of a shape of the rock mass, information of a color of the rock mass, and information of humidity of the rock mass.

In the present invention, it is preferable that the information of particle size distribution of the rock includes at least one of a quantity of edges extracted from an image of the first portion or the second portion imaged by an imaging device, and a ratio of variation of the quantity of edges to variation of a size of a structural element, the ratio having been obtained by changing the size of the structural element used in processing before the edge is extracted, and the information of a shape of the rock mass includes a distance between the imaging device and the rock mass.

In the present invention, it is preferable that the first operation is an operation of when an operator operates the excavation device to perform excavation.

According to the present invention, an excavation system comprises: an excavation machine including an excavation device provided with an excavation work tool, a detection device that detects a state of an object to be excavated by the excavation device, and a control device that operates the excavation device; and a management device including a storage device that stores a plurality of pieces of excavation information in which a state of a first portion that is a portion before excavated by a learning excavation device, and a first operation of when the learning excavation device excavates the first portion are associated with each other, and a processing device that obtains a state of a second portion that is a portion intended to be excavated by the excavation device, the state having been detected by the detection device, selects the state of the first portion corresponding to the state of the second portion, from among the states of the first portions of the plurality of pieces of excavation information, and determines the first operation corresponding to the selected state, as a second operation of when the excavation device excavates the second portion, and transmits information for operating the excavation device with the determined second operation to the control device.

In the present invention, it is preferable that the processing device refers to the excavation information, and selects the state of the first portion on the basis of a degree of similarity to the state of the second portion obtained by the estimation unit.

In the present invention, it is preferable that the processing device refers to the excavation information, selects the states of the plurality of first portions on the basis of a degree of similarity to the obtained state of the second portion, and determines the second operation, using the plurality of first operations corresponding to the respective selected states of the first portions.

In the present invention, it is preferable that the processing device stores, to the storage device, evaluation information for evaluating an excavation state of when the excavation device is operated with the second operation to perform excavation, in association with excavation information including the first operation corresponding to the second operation.

In the present invention, it is preferable that the processing device stores, to the storage device, the determined second operation.

In the present invention, it is preferable that the object to be excavated by the excavation device is a rock mass including rock, and the state of the first portion and the state of the second portion included in the excavation information include at least one of information of particle size distribution of the rock, information of a shape of the rock mass, information of a color of the rock mass, and information of humidity of the rock mass.

In the present invention, it is preferable that the information of particle size distribution of the rock includes at least one of a quantity of edges extracted from an image of the first portion or the second portion imaged by an imaging device, and a ratio of variation of the quantity of edges to variation of a size of a structural element, the ratio having been obtained by changing the size of the structural element used in processing before the edge is extracted, and the information of a shape of the rock mass includes a distance between the imaging device and the rock mass.

In the present invention, it is preferable that the first operation is an operation of when an operator operates the excavation device to perform excavation.

Advantageous Effects of Invention

The present invention can provide an excavation machine that can perform automatic excavation even when a state of a portion to be excavated by the excavation machine is changed from hour to hour.

BRIEF DESCRIPTION OF DRAWINGS

FIG. 5 is a diagram for describing excavation information and an example in which an excavation device is controlled using the excavation information.

FIG. 6 is a diagram for describing a method of creating excavation information.

FIG. 9 is a diagram illustrating information of particle size distribution of rock included in a first portion state and a second portion state according to an embodiment.

FIG. 15-1 is a diagram illustrating a result of expansion calculation applied to an image, using a structural element.

FIG. 15-2 is a diagram illustrating a result of contraction calculation applied to an image, using a structural element.

FIG. 15-3 is a diagram illustrating an example of processing of extracting an edge.

FIG. 15-4 is a diagram illustrating examples of intermediate edge images.

FIG. 15-5 is a diagram illustrating an example of an edge image.

FIG. 22-1 is a flowchart illustrating an example of a procedure of generating an excavation information database.

FIG. 22-2 is a diagram illustrating an example of a procedure of extracting an edge.

FIG. 24-1 is a diagram illustrating an example of an excavation information database including a first excavation quantity.

FIG. 24-2 is a diagram illustrating an example of an excavation information database including a second operation.

DESCRIPTION OF EMBODIMENTS

Forms for implementing the present invention (embodiments) will be described in detail with reference to the drawings.

<Outline of Excavation Machine>

Figure 1:
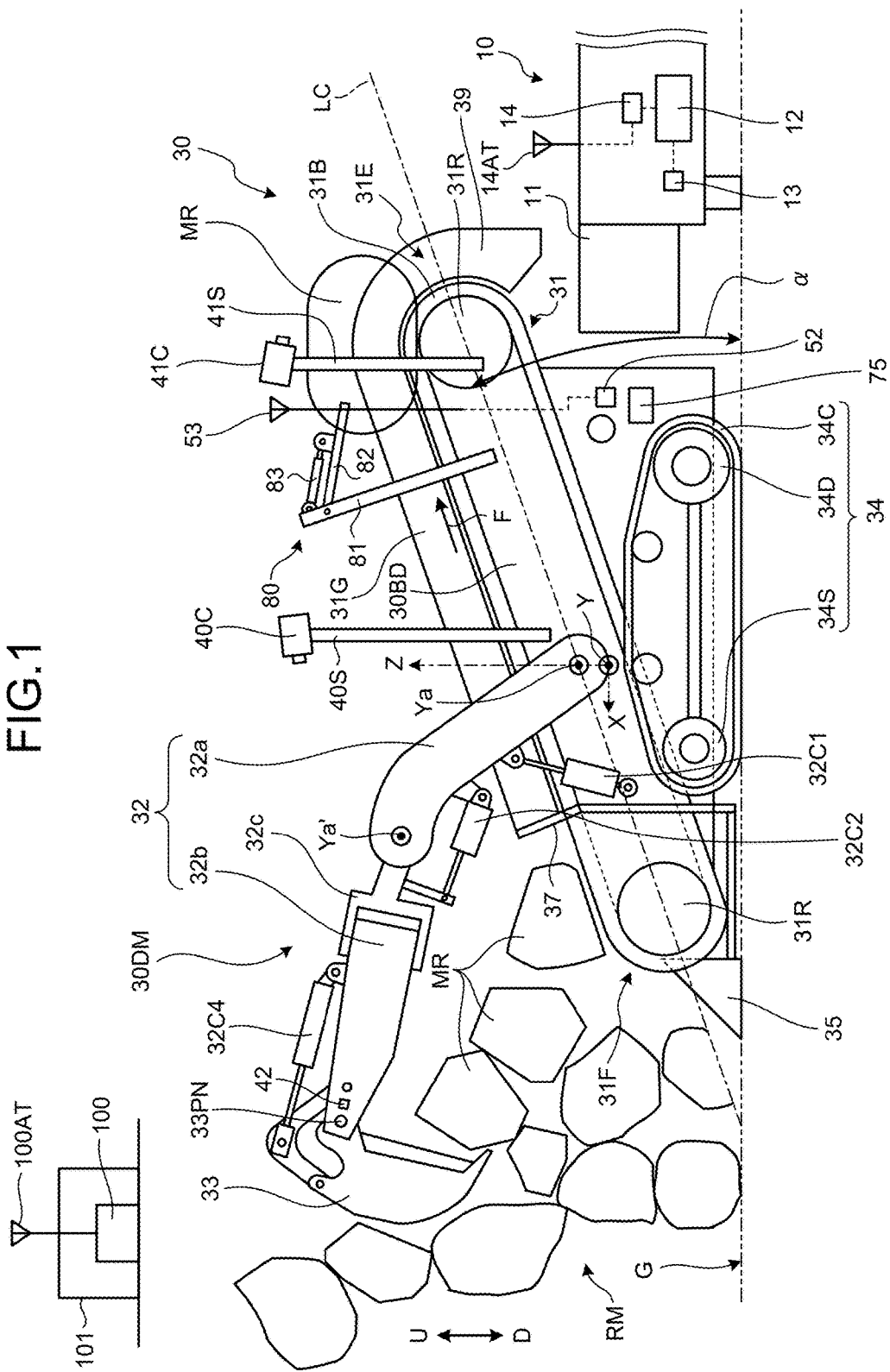
FIG. 1 is a side view illustrating an excavation machine according to an embodiment.
Figure 2:
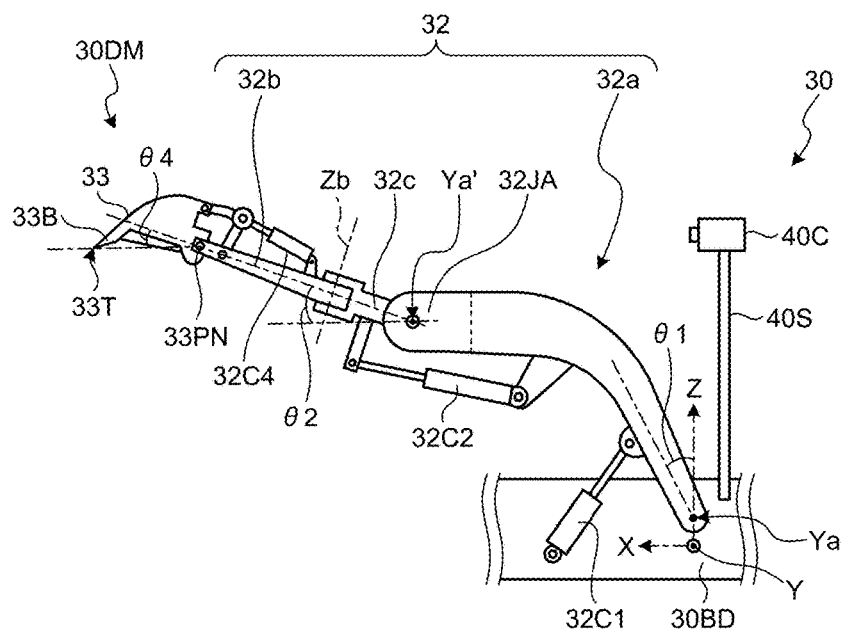
FIG. 2 is a diagram illustrating a part of a side surface of an excavation machine according to an embodiment.
Figure 3:
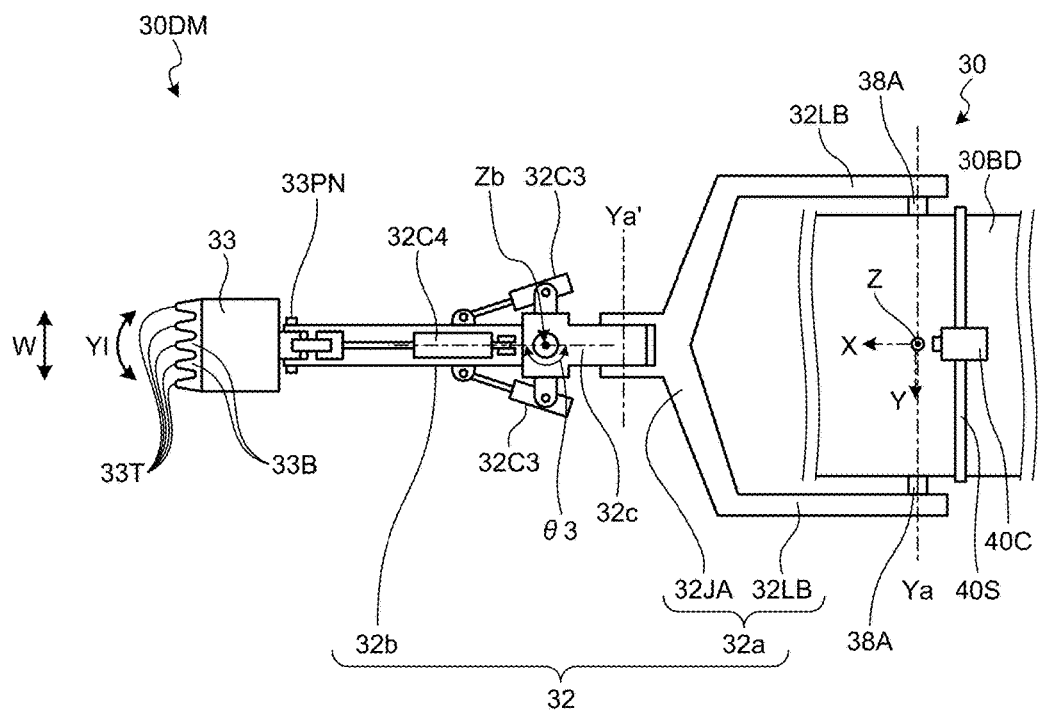
FIG. 3 is a plan view illustrating a part of an excavation machine according to an embodiment.

FIG. 1 is a side view illustrating an excavation machine 30 according to an embodiment. FIG. 1 illustrates a state in which rock MR of a rock mass RM is excavated by the excavation machine 30, and the excavated rock MR is conveyed. FIG. 2 is a diagram illustrating a part of a side surface of the excavation machine 30 according to an embodiment. FIG. 3 is a plan view illustrating a part of the excavation machine 30 according to an embodiment. An X-Y-Z coordinate system illustrated in FIGS. 1 to 3 is a local coordinate system of the excavation machine 30.

The excavation machine 30 excavates the rock MR from the rock mass RM in a mine, and excavates the rock MR or soil at a construction site. In an embodiment, the excavation machine 30 is a mine machine used to excavate the rock mass RM of ore in the underground of a mine to mine the ore. The ore of the mine is the rock MR. The excavation machine 30 may just be provided with an excavation device including a work tool for excavating an object, and is not limited to the mine machine. The excavation machine 30 may be an excavator, for example. In an embodiment, a side of the excavation machine 30, the side being installed on a ground G, is referred to as a lower side, and an opposite side of the lower side is referred to as upper side.

The excavation machine 30 includes an excavation device 30DM provided with a bucket 33 as an excavation work tool, a front detection device 40C as a detection device that detects a state of an object to be excavated by the excavation device 30DM, and a control device 75. The excavation machine 30 excavates the rock mass RM of the rock MR in a tunnel of the mine, and loads the excavated rock MR to a vessel 11 of a carrying machine 10. An excavation device 30DM, a feeder 31, a travel device 34, a penetration member 35, and a rock guard 37 are attached to a body 30BD of the excavation machine 30. A side provided with the penetration member 35 is a front side of the excavation machine 30, and an opposite side of the side provided with the penetration member 35 is a rear side of the excavation machine 30. Note that the excavation machine 30 may just be provided with at least the excavation device 30DM, and may not be provided with the feeder 31, the travel device 34, the penetration member 35, and the rock guard 37. Further, the work tool is not limited to the bucket 33, and may be one of various attachments such as a clamshell or a hydraulic crusher.

<Excavation Device 30DM>

It is the excavation device 30DM that loads the rock MR on the feeder 31. The excavation device 30DM performs an excavation operation on a loading side 31F of the feeder 31, that is, in front of the feeder 31, and sends the rock MR to the feeder 31.

The excavation device 30DM is provided with a support mechanism 32 and the bucket 33. The support mechanism 32 includes a boom 32a attached to the body 30BD and rotated around a first axis line Ya, an arm 32b rotated around an axis line Ya' parallel to the first axis line Ya, and a connection member 32c that connects the boom 32a and the arm 32b. The boom 32a is attached to the body 30BD and rotated around the first axis line Ya. The arm 32b is rotated around the axis line Ya' parallel to the first axis line Ya. The connection member 32c connects the boom 32a and the arm 32b.

The connection member 32c is attached to the boom 32a. The arm 32b has one end portion side attached to the connection member 32c and the other end portion side attached to the bucket 33. In an embodiment, the number of the arms 32b is one.

In an embodiment, as illustrated in FIG. 3, the boom 32a includes two first rod-like members 32LB and 32LB, and a beam 32JA that connects the two first rod-like members 32LB and 32LB. As illustrated, the boom 32a of an embodiment has a gate-type shape. However, the shape of the boom 32a is not limited to the gate type. The two first rod-like members 32LB and 32LB are provided on both sides of the body 30BD in a width direction W. The first rod-like members 32LB and 32LB included in the boom 32a are respectively coupled with the body 30BD with pins 38A parallel to the first axis line Ya, as illustrated in FIG. 3. Therefore, the boom 32a is rotated around the first axis line Ya.

In an embodiment, the boom 32a is rotated as a hydraulic cylinder 32C1 expands and contracts, the hydraulic cylinder 32C1 being an actuator provided between the first rod-like member 32LB and the body 30BD. In an embodiment, the number of the first rod-like members 32LB included in the boom 32a is two, and thus the number of the hydraulic cylinders 32C1 is two. The device that rotates the boom 32a is not limited to the hydraulic cylinder 32C1, and may be a motor, for example.

The connection member 32c and the beam 32JA of the boom 32a are coupled with a pin parallel to the axis line Ya' parallel to the first axis line Ya. Therefore, the connection member 32c is rotated around the axis line Ya' parallel to the first axis line Ya with respect to the boom 32a. When the connection member 32c is rotated, the arm 32b coupled with the connection member 32c with a pin and the bucket 33 attached to a tip end of the arm 32b are also rotated. The arm 32b is rotated around both the axis line Ya' parallel to the first axis line Ya and an axis line Zb. The axis line Zb is an axis line parallel to a second axis line perpendicular to the first axis line Ya. In an embodiment, the connection member 32c is rotated as a hydraulic cylinder 32C2 expands and contracts, the hydraulic cylinder 32C2 being an actuator provided between the connection member 32c and the boom 32a. The device that rotates the connection member 32c is not limited to the hydraulic cylinder 32C2, and may be a motor, for example.

In an embodiment, the hydraulic cylinder 32C2 that rotates the connection member 32c, the arm 32b, and the bucket 33 is arranged below the boom 32a and the connection member 32c, that is, on the body 30BD side.

However, an embodiment is not limited thereto. For example, the hydraulic cylinder 32C2 may be arranged above the boom 32a and the connection member 32c, that is, on a side distant from the body 30BD with respect to the boom 32a and the connection member 32c. Further, the number of the hydraulic cylinders 32C2 is not limited, and may be one, or two or more.

In an embodiment, the excavation device 30DM includes the bucket 33. The bucket 33 is a device that sends the rock MR to the feeder 31 on a loading side of the feeder 31 as a conveying device. The bucket 33 is controlled by the control device 75 provided in the excavation machine 30 on the basis of ore information as information regarding a state of the rock MR of the rock mass RM acquired by the front detection device 40C.

The bucket 33 is attached to the tip end of the arm 32b, that is, an end portion different from an end portion on the connection member 32c side, of two end portions of the arm 32b. The bucket 33 is attached to the arm 32b with a bucket pin 33PN. With such a configuration, the bucket 33 is rotated around the bucket pin 33PN. The bucket 33 includes a plurality of blades 33B on an end portion opposite to the bucket pin 33PN. A tip end of the blade is an edge 33T.

A hydraulic cylinder 32C4 as an actuator is provided between the bucket 33 and the arm 32b. The hydraulic cylinder 32C4 expands and contracts to rotate the bucket 33 around the bucket pin 33PN. The number of the hydraulic cylinders 32C4 is not limited, and may be one, or two or more.

The connection member 32c and the arm 32b are coupled with a pin parallel to the axis line Zb. Hydraulic cylinders 32C3 as actuators are respectively provided on both sides of the arm 32b in the width direction W. The hydraulic cylinder 32C3 is provided between the arm 32b and the connection member 32c. When one of the hydraulic cylinders 32C3 expands and the other of the hydraulic cylinders 32C3 contracts, the arm 32b comes close to a side to which the contracting hydraulic cylinder 32C3 is attached. With such a configuration, the arm 32b is rotated around the axis line Zb with respect to the boom 32a, to be more specific, the connection member 32c connected to the boom 32a. The number of the hydraulic cylinders 32C3 may be one.

When the arm 32b is rotated around the axis line Zb, the arm 32b and the bucket 33 attached to the tip end of the arm 32b are also rotated around the second axis line Zb (the direction illustrated by the arrow Y1 in FIG. 3). Therefore, the bucket 33 can be moved in the width direction W of the excavation machine 30. As a result, the excavation machine 30 has a large range to excavate with the bucket 33, and thus can more efficiently excavate the rock MR from the rock mass RM. Further, the arm 32b is rotated around the axis line Zb with respect to the connection member 32c, and the connection member 32c is rotated around the axis line Ya' parallel to the first axis line with respect to the boom 32a. Therefore, a movable range of the bucket 33 can be made large.

In an embodiment, a humidity sensor 42 for measuring ambient humidity of the bucket 33 is attached to a bucket pin 33PN side of the arm 32b. The humidity detected by the humidity sensor 42 becomes information indicating an amount of moisture of the rock mass RM.

<Feeder 31>

The feeder 31 loads the rock MR from the rock mass RM, conveys the rock MR in a direction away from the rock mass RM, and then discharges the rock MR. That is, the feeder 31 conveys the rock MR loaded in front of the excavation machine 30 toward the rear, and discharges the rock MR from the rear. The feeder 31 uses a conveyance belt 31B as an endless conveyance body, for example, and allows the conveyance belt 31B to be stretched over a pair of rollers 31R and 31R and to be rotated, thereby to convey the rock MR from the loading side 31F to a discharge side 31E. The loading side 31F is a rock mass RM side, and the discharge side 31E is an opposite side of the loading side 31F.

As illustrated in FIG. 1, the feeder 31 is provided with a pair of guides 31G on both sides in a width direction. The pair of guides 31G suppresses drop of the rock MR from the feeder 31 in the middle of being conveyed by the feeder 31. The width direction is a direction perpendicular to a front and rear direction of the excavation machine 30. Further, the width direction is a direction perpendicular to a direction F in which the feeder 31 conveys the rock MR, and is also a direction parallel to a rotation center axis of the pair of rollers 31R and 31R provided in the feeder 31. The width direction of the feeder 31 is also the width direction of the body 30BD.

The feeder 31 is provided with a guide 39 for guiding the rock MR into the vessel 11 of the carrying machine 10, on the discharge side 31E. The feeder 31 is rotated around an axis line in the width direction, in front of the body 30BD, that is, on the loading side 31F of the feeder 31. With this operation, the feeder 31 can change an angle α with respect to the ground G. The angle α is an angle made by a straight line LC that connects the rotation center axes of the pair of rollers 31R and 31R provided in the feeder 31 and the ground G.

<Body 30BD>

The travel device 34 that allows the body 30BD to travel is attached to the body 30BD. The travel device 34 includes a pair of crawler belts 34C provided on both sides of the body 30BD in the width direction, a pair of driving wheels 34D provided on both sides of the body 30BD in the width direction, and a pair of driven wheels 34S provide on both sides of the body 30BD in the width direction. The crawler belts 34C are stretched over the driving wheels 34D and the driven wheels 34S. The respective driving wheels 34D are independently and separately driven. In the present embodiment, the excavation machine 30 is provided with travel motors for the respective driving wheels 34D. With such a configuration, the pair of crawler belts 34C and 34C are independently and separately driven.

The penetration member 35 is provided on the loading side 31F of the feeder 31. The penetration member 35 penetrates the rock mass RM when the excavation machine 30 penetrates the rock mass RM. When the penetration member 35 penetrates the rock mass RM, the travel device 34 causes the feeder 31 and the body 30BD to which the penetration member 35 is attached to travel forward, and causes the penetration member 35 to penetrate the rock mass RM while operating the feeder 31.

The rock guard 37 is provided in front of the crawler belts 34C of the travel device 34. In an embodiment, the rock guard 37 is attached to the body 30BD. The rock guard 37 protects the travel device 34 from the rock MR flying from the excavation device 30DM during the excavation, and protects the travel device 34 from rock and the like existing in a tunnel at the time of traveling of the excavation machine 30, for example. The rock guard 37 suppresses a decrease in durability of the travel device 34.

<Switching Mechanism 80>

In the present embodiment, the excavation machine 30 is provided with a switching mechanism 80 that switches discharge of the rock MR and stop of the discharge, between a portion (loading side 31F) where the rock MR is loaded onto the feeder 31, and a portion (discharge side 31E) where the rock MR is discharged from the feeder 31. The switching mechanism 80 includes a support body 81, a cover 82, and a hydraulic cylinder 83 as an actuator that opens and closes the cover 82. The support body 81 is a gate-type member including two leg portions having one end portions attached to both sides of the body 30BD in the width direction, to be specific, to both sides of the feeder 31 in the width direction, and a connection portion that connects the other end portions of the two leg portions. The rock MR passes through a portion surrounded by the two leg portions and the connection portion.

The cover 82 is a plate-like member, and is provided on the portion surrounded by the two leg portions and the connection portion. The cover 82 is rotated around a predetermined axis line existing on a connection portion side of the support body 81. The hydraulic cylinder 83 is provided between the cover 82 and the connection portion of the support body 81. When the hydraulic cylinder 83 expands and contracts, the cover 82 opens and closes the portion surrounded by the two leg portions and the connection portion. When the cover 82 is opened, the rock MR passes through the portion surrounded by the two leg portions and the connection portion. When the cover 82 is closed, the rock MR does not pass through the portion surrounded by the two leg portions and the connection portion. In doing so, the excavation machine 30 can adjust a discharge quantity of the rock MR from the feeder 31.

<Detection Device>

The front detection device 40C provided in the excavation machine 30 is attached to a support member 40S attached to the body 30BD, as illustrated in FIG. 1. The front detection device 40C is attached such that a portion that collects information faces the loading side 31F of the body 30BD, that is, the front. In an embodiment, the front detection device 40C detects an object to be excavated by the excavation device 30DM, in an embodiment, the state of the rock mass RM, and outputs a detection result to the control device 75 illustrated in FIG. 1. The front detection device 40C is installed at a high position of the body 30BD with the support member 40S so as to image the entire portion excavated by the excavation device 30DM.

The front detection device 40C may be provided with a mechanism that changes a posture to cause the portion that detects the object to face a direction of the detected object. In this case, the control device 75 may control the mechanism that changes the posture of the front detection device 40C. In an embodiment, the bucket 33 provided in the excavation device 30DM is moved in the width direction W of the excavation machine 30. Therefore, the control device 75 may control the mechanism that changes the posture to move the front detection device 40C toward the bucket 33, when the bucket 33 is moved in the width direction W.

The front detection device 40C is arranged in a high position of the body 30BD. However, the position of the front detection device 40C and an attachment structure to the body 30BD are not limited. For example, the front detection device 40C may be attached to a lower portion of the excavation device 30DM in a static state by the operation of the excavation device 30DM.

The front detection device 40C includes an imaging element such as a charge coupled device (CCD) image sensor or a complementary metal oxide semiconductor (CMOS) image sensor, and acquires an optical image of an object and detects an external form of the object. The information detected by the front detection device 40C is acquired by the control device 75. The front detection device 40C is a distance image sensor, a camera, a stereo camera, a laser scanner, a three-dimensional distance sensor, or the like. The portion of the front detection device 40C that detects the object is a lens or a light-receiving unit through which light entering the imaging element passes. In an embodiment, as the front detection device 40C, a distance image sensor is used. The distance image sensor irradiates the object with light, and acquires a distance image by a method of measuring intensity of reflection light from the object, a time to receive the reflection light, an irradiation pattern, and the like. In an embodiment, as the front detection device 40C, the distance image sensor, a distance measuring sensor, a normal camera, or the like is used. The control device 75 can acquire a distance image or a color image of the rock mass RM detected by the front detection device 40, measure at least one of a shape of the rock mass RM, particle size distribution of the rock MR on a surface of the rock mass RM, a color of the surface of the rock mass RM, and moisture content of the rock MR of the rock mass RM, and obtain states of a first portion and a second portion described below on the basis of a measurement result.

In an embodiment, the excavation machine 30 is provided with a rear detection device 41C on the discharge side 31E of the body 30BD, that is, on the rear. To be more specific, the rear detection device 41C is attached to a support member 41S such that a portion that collects information faces the discharge side 31E of the body 30BD, that is, the rear. The rear detection device 41C includes an imaging element such as a CCD image sensor or a CMOS image sensor, acquires an optical image of an object, and detects and outputs an external form of the object, similarly to the above-described front detection device 40C. The information detected by the rear detection device 41C is acquired by the control device 75. The rear detection device 41C acquires load information that is information regarding a state of the rock MR loaded in the vessel 11 of the carrying machine 10 illustrated in FIG. 1. The load information is a three-dimensional space data of the rock MR.

In an embodiment, as the rear detection device 41C, a stereo camera is used. In an embodiment, the excavation machine 30 is provided with two rear detection devices 41C on both sides of the feeder 31 in the width direction. That is, the plurality of rear detection devices 41C is installed in a plurality of places on the body 30BD in the width direction. With such a configuration, the excavation machine 30 can detect the object with one of the rear detection devices 41C even if the object detected by the other of the rear detection devices 41C is hidden behind.

The control device 75 can estimate a quantity of the rock MR conveyed by the feeder 31, that is, an excavation quantity of the rock MR excavated by the excavation device 30DM from the load information detected by the rear detection device 41C. For example, the control device 75 can estimate a volume of the rock MR from an image of the rock MR imaged by the rear detection device 41C, and multiply the volume of the rock MR by average density of the rock MR, thereby to estimate the excavation quantity.

The control device 75 is provided in the excavation machine 30, and controls at least the operation of the excavation device 30DM. In addition, the control device 75 controls the operations of the feeder 31 and the travel device 34. The control device 75 is connected with a communication device 52 provided in the excavation machine 30. In an embodiment, the communication device 52 is a wireless communication device, and includes a wireless communication antenna 53. The control device 75 can perform communication with a management device 100 outside the excavation machine 30 and a control device 12 of the carrying machine 10 through the communication device 52.

The control device 75 of the excavation machine 30 performs communication with the control device 12 of the carrying machine 10 through a communication device 14 and an antenna 14AT connected to the control device 12 of the carrying machine 10. The control device 12 of the carrying machine 10 is provided with a load capacity detection device 13 that detects a load capacity of the vessel 11. The load capacity is mass of the load. The control device 75 of the excavation machine 30 acquires the load capacity of the vessel 11 acquired by the control device 12 of the carrying machine 10 through the communication device 52, the antenna 53, and the antenna 14AT and the communication device 14 of the carrying machine 10.

The control device 75 of the excavation machine 30 performs communication with the management device 100 through an antenna 100AT of a management facility 101. The control device 75 transmits, to the management device 100, an operation time, the excavation quantity, a position, and the like as information regarding a state of the excavation machine 30. Further, the control device 75 acquires, from the management device 100, information regarding a place where the excavation machine 30 excavates or information to be used for control of the excavation device 30DM.

<Details of Control Device 75 of Excavation Machine 30>

Figure 4:
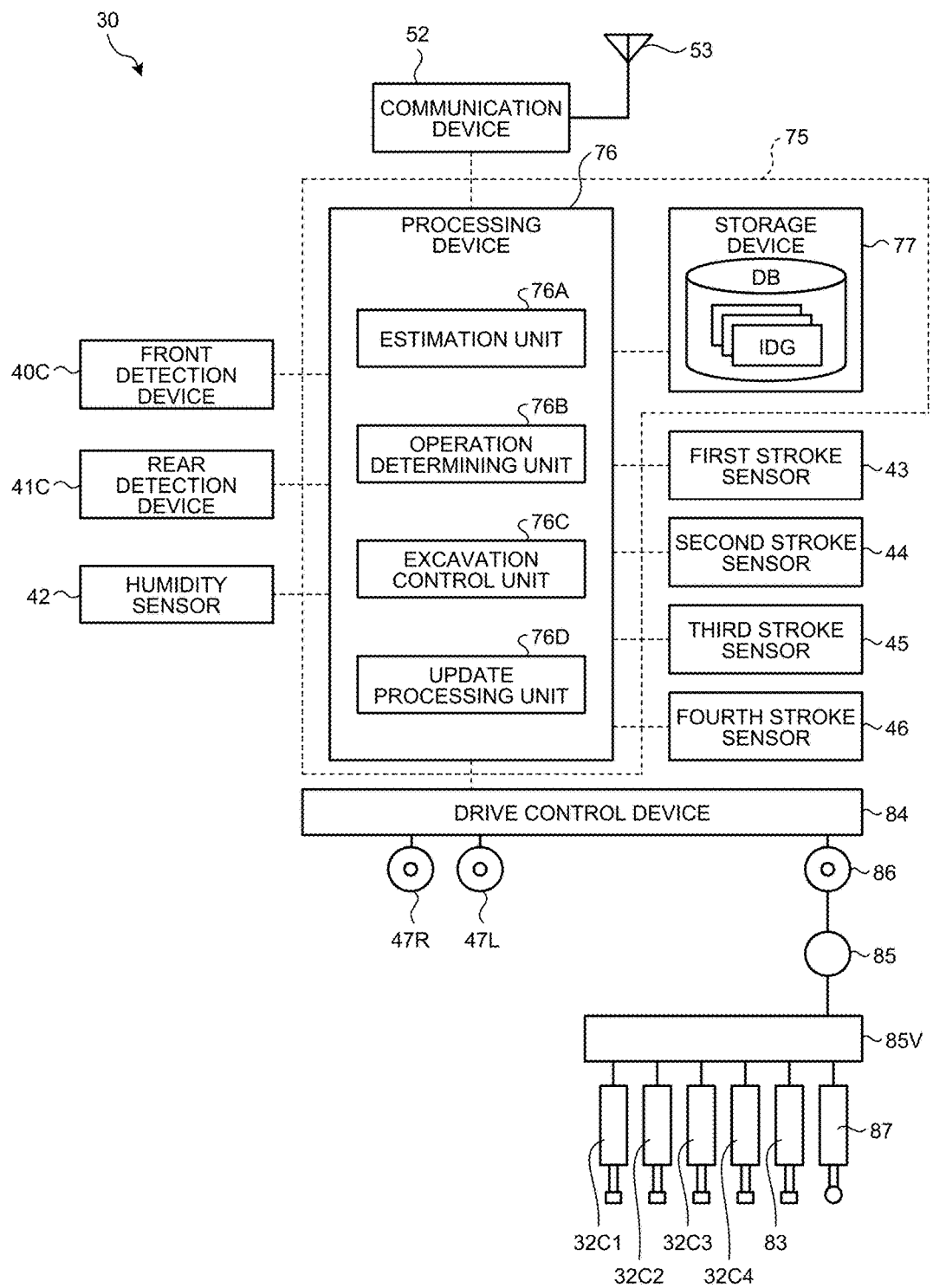
FIG. 4 is a block diagram illustrating an example of a control device provided in an excavation machine according to an embodiment.

FIG. 4 is a block diagram illustrating an example of the control device 75 provided in the excavation machine 30 according to an embodiment. The control device 75 provided in the excavation machine 30 controls the feeder 31, the excavation device 30DM, the travel device 34, and the switching mechanism 80. The control device 75 is provided with a processing device 76 and a storage device 77. The processing device 76 is connected with the front detection device 40C, the rear detection device 41C, the humidity sensor 42, sensors such as a first stroke sensor 43, a second stroke sensor 44, a third stroke sensor 45, and a fourth stroke sensor 46, and electronic devices such as the communication device 52 and a drive control device 84. The processing device 76 may be connected with a device other than these sensors and electronic devices.

The processing device 76 is a microcomputer including a central processing unit (CPU), for example.

The processing device 76 controls at least the operation of the excavation device 30DM on the basis of a detection result of the front detection device 40C. The processing device 76 includes an estimation unit 76A, an operation determining unit 76B, and an excavation control unit 76C. In an embodiment, the processing device 76 further includes an update processing unit 76D.

The estimation unit 76A obtains the state of the second portion. The second portion is a portion detected by the front detection device 40C as a detection device, and is a portion intended to be excavated by the excavation device 30DM. The operation determining unit 76B selects a state of the first portion corresponding to the state of the second portion obtained by the estimation unit 76A, from among states of the first portions of a plurality of pieces of excavation information IDG. In an embodiment, the states of the first portion and the second portion are at least one of the particle size distribution of the rock MR, the shape of the rock mass RM, the amount of moisture of the rock mass RM, and the color of the rock mass RM.

The excavation information IDG is used by the excavation device 30DM to determine an operation when excavating the object. The excavation information IDG is information in which a state before excavation of a portion to be excavated (this portion is referred to as first portion) when the excavation device 30DM creates the excavation information IDG, and an operation of when the excavation device 30DM excavates the first portion (this operation of the excavation device 30DM is referred to as first operation) are associated with each other. The excavation information IDG is created in advance and stored in the storage device 77. A method of creating the excavation information IDG will be described below.

The operation determining unit 76B determines the first operation corresponding to the selected state, as a second operation that is an operation of when the excavation device 30DM excavates the second portion. The excavation control unit 76C operates the excavation device 30DM with the second operation determined by the operation determining unit 76B. The update processing unit 76D updates the excavation information IDG, using the excavation quantity, excavation force, or other information regarding excavation.

The estimation unit 76A, the operation determining unit 76B, the excavation control unit 76C, and the update processing unit 76D are realized by the processing device 76 executing a computer program stored in the storage device 77. The computer program includes commands for realizing functions of the estimation unit 76A, the operation determining unit 76B, the excavation control unit 76C, and the update processing unit 76D. Further, the estimation unit 76A, the operation determining unit 76B, the excavation control unit 76C, and the update processing unit 76D may be realized by a processing circuit using a system large scale integrated circuit (LSI).

The storage device 77 is a device that stores information. The storage device 77 is connected with the processing device 76. As the storage device 77, a random access memory (RAM), a read only memory (ROM), a flash memory, or a hard disk drive can be exemplified. The storage device 77 stores a computer program and various types of information necessary for the processing device 76 to control the excavation device 30DM. The various types of information include the excavation information IDG. In an embodiment, the storage device 77 stores a plurality of pieces of the excavation information IDG. Hereinafter, the plurality of pieces of excavation information IDG is referred to as excavation information database DB.

The communication device 52 is connected with the processing device 76. The processing device 76 performs data communication with the communication device 14 mounted on the carrying machine 10 or the management device 100 through the communication device 52 and the antenna 53.

A drive control device 48 is a microcomputer, for example. The drive control device 48 controls motors 47L and 47R provided in the travel device 34, a motor 86 that drives a hydraulic pump 85, and an operation of an electromagnetic control valve 85V, on the basis of a command from the processing device 76. The motor 47L drives one of the crawler belts 34C provided in the excavation machine 30, and the motor 47R drives the other of the crawler belts 34C.

The hydraulic pump 85 is a device that supplies hydraulic oil to the two hydraulic cylinders 32C1 and 32C1 that rotate the boom 32a of the excavation device 30DM, the hydraulic cylinder 32C2 that rotates the connection member 32c, the two hydraulic cylinders 32C3 and 32C3 that rotate the arm 32b, the hydraulic cylinder 32C4 that rotates the bucket 33, the hydraulic cylinder 83, and a hydraulic cylinder 87. The hydraulic cylinder 83 is an actuator provided in the switching mechanism 80. The hydraulic cylinder 87 is an actuator that changes the posture of the feeder 31.

The electromagnetic control valve 85V is a device that controls a flow rate of the hydraulic oil supplied from the hydraulic pump 85 to the hydraulic cylinders 32C1, 32C1, 32C2, 32C3, 32C3, and 32C4 of the excavation device 30DM, the hydraulic cylinder 83 of the switching mechanism 80, and the hydraulic cylinder 87 of the feeder 31.

Motors or electromagnetic actuators such as solenoids may be used in place of the hydraulic cylinders 32C1, 32C2, 32C3, 32C4, 83, and 87. Hydraulic motors may be used in place of the motors 47L and 47R provided in the travel device 34. The feeder 31 may be driven by a hydraulic motor driven with the hydraulic oil discharged by the hydraulic pump 85.

The first stroke sensor 43 is provided in either one of the two hydraulic cylinders 32C1 and 32C1 that operate the boom 32a. The second stroke sensor 44 is provided in the hydraulic cylinder 32C2 that operates the connection member 32c. The third stroke sensor 45 is provided in either one of the two hydraulic cylinders 32C3 and 32C3 that rotate the arm 32b in the width direction W. The fourth stroke sensor 46 is provided in the hydraulic cylinder 32C4 that operates the bucket 33. Two first stroke sensors 43 may be provided in both the hydraulic cylinders 32C1 and 32C2. Similarly, two third stroke sensors 45 may be provided in both the hydraulic cylinders 32C3 and 32C4.

The first stroke sensor 43 detects a stroke length of the hydraulic cylinder 32C1. The first stroke sensor 43 detects a displacement quantity corresponding to expansion of the hydraulic cylinder 32C1, and outputs the displacement quantity to the processing device 76. The processing device 76 calculates a cylinder length of the hydraulic cylinder 32C1 corresponding to the displacement quantity of the first stroke sensor 43 (hereinafter, the cylinder length is appropriately referred to as boom cylinder length). The processing device 76 calculates an inclination angle $\theta 1$ (see FIG. 2) of the boom 32a with respect to a direction perpendicular to an X-Y plane in a local coordinate system of the excavation machine 30, to be specific, a local coordinate system [X-Y-Z] of the body 30BD, that is, a Z-axis direction, using the boom cylinder length detected by the first stroke sensor 43.

The second stroke sensor 44 detects a stroke length of the hydraulic cylinder 32C2. The second stroke sensor 44 detects a displacement quantity corresponding to expansion of the hydraulic cylinder 32C2, and outputs the displacement quantity to the processing device 76. The processing device 76 calculates a cylinder length of the hydraulic cylinder 32C2 corresponding to the displacement quantity of the second stroke sensor 44 (hereinafter, the cylinder length is appropriately referred to as arm cylinder length). The processing device 76 calculates an inclination angle $\theta 2$ (see FIG. 2) of the arm 32b with respect to the boom 32a, using the arm cylinder length detected by the second stroke sensor 44.

The third stroke sensor 45 detects a stroke length of the hydraulic cylinder 32C3. The third stroke sensor 45 detects a displacement quantity corresponding to expansion of the hydraulic cylinder 32C3, and outputs the displacement quantity to the processing device 76. The processing device 76 calculates a cylinder length of the hydraulic cylinder 32C3 corresponding to the displacement quantity of the third stroke sensor 45. The processing device 76 calculates an inclination angle $\theta 3$ (see FIG. 3) of the arm 32b with respect to a direction into which the connection member 32c extends, using the cylinder length of the hydraulic cylinder 32C3 detected by the third stroke sensor 45.

The fourth stroke sensor 46 detects a stroke length of the hydraulic cylinder 32C4. The fourth stroke sensor 46 detects a displacement quantity corresponding to expansion of the hydraulic cylinder 32C4, and outputs the displacement quantity to the processing device 76. The processing device 76 calculates a cylinder length of the hydraulic cylinder 32C4 corresponding to the displacement quantity of the fourth stroke sensor 46 (hereinafter, the cylinder length is appropriately referred to as bucket cylinder length). The processing device 76 calculates an inclination angle $\theta 4$ (see FIG. 2) with respect to the arm 32b of the edge 33T of the blade 33B included in the bucket 33 from the bucket cylinder length detected by the fourth stroke sensor 46.

The inclination angles $\theta 1$, $\theta 2$, $\theta 3$, and $\theta 4$ of the boom 32a, the arm 32b, and the bucket 33 may be acquired by a rotary encoder attached to the boom 32a and which measures the inclination angle of the boom 32a, a rotary encoder attached to the arm 32b and which measures the inclination angles of the arm 32b, and a rotary encoder attached to the bucket 33 and which measures the inclination angle of the bucket 33, other than the measurement by the first stroke sensor 43, and the like.

A position of the edge 33T of the bucket 33 is obtained on the basis of the inclination angles $\theta 1$, $\theta 2$, $\theta 3$, and $\theta 4$ of the boom 32a, the arm 32b, and the bucket 33, and geometric shapes of the boom 32a, the arm 32b, the connection member 32c, and the bucket 33. Change of the position of the edge 33T of the bucket 33 at the time of excavation of the excavation device 30DM with respect to time is information that indicates the operation of the excavation device 30DM at the time of excavation.

<Excavation by Excavation Device 30DM>

Figures 1, 15:
Figures 2, 15:
Figures 3, 15:
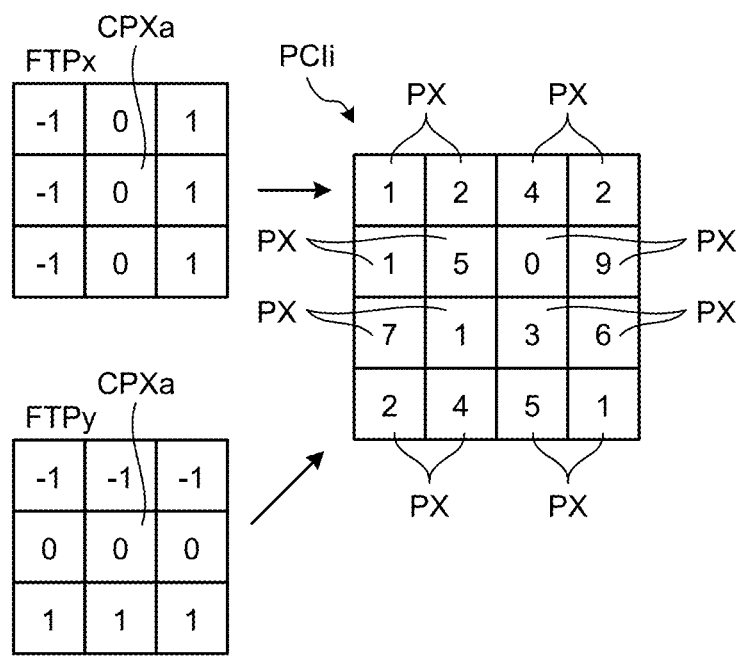
Figure 15:
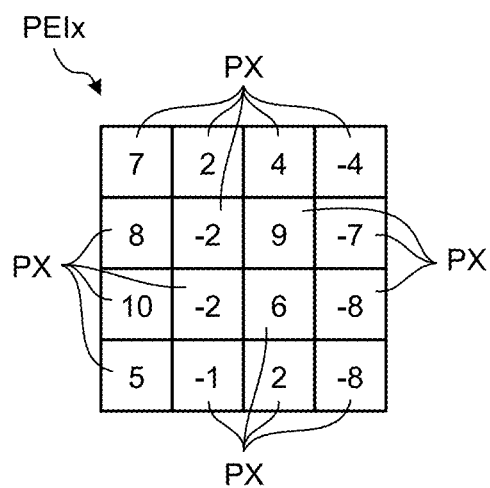
Figure 4:
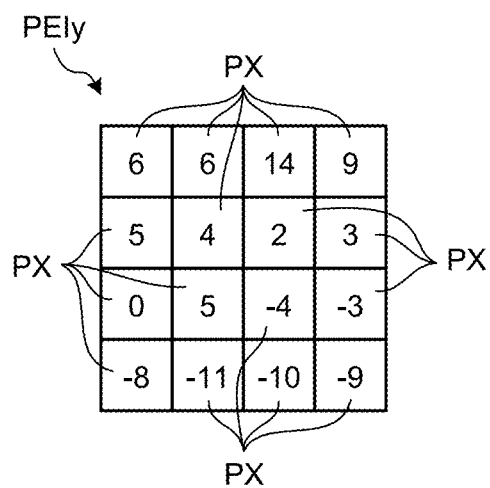
Figures 5, 15:
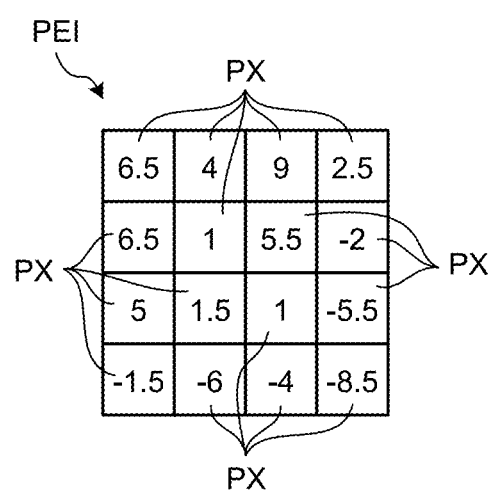

FIG. 5 is a diagram for describing the excavation information IDG and an example in which the excavation device 30DM is controlled using the excavation information IDG. Assume that the object excavated by the excavation device 30DM is a rock mass including rock. In an embodiment, work for creating the excavation information IDG is referred to as excavation information generation work. The excavation device 30DM used in the excavation information generation work is referred to as learning excavation device 30DMt.

The excavation information database DB stored in the storage device 77 includes the plurality of pieces of excavation information IDG, as described above. Each piece of excavation information IDG is information in which a state IMt of a first portion RMt and a first operation ICt are associated with each other. Hereinafter, the state IMt of the first portion RMt is appropriately referred to as first portion state IMt.

In a case where the excavation machine 30 excavates a second portion RMp illustrated in FIG. 5, the front detection device 40C detects a state of the second portion RMp that is the object to be excavated by the excavation device 30DM. In an embodiment, the front detection device 40C outputs the detected second portion RMp as image information PCIp. Hereinafter, the image information PCIp is appropriately referred to as second portion image information PCIp. The estimation unit 76A of the processing device 76 illustrated in FIG. 4 acquires second portion image information PCIp, and applies image processing to the second portion image information PCIp to obtain the state of the second portion RMp. Hereinafter, the state of the second portion RMp is appropriately referred to as second portion state IMp.

The operation determining unit 76B of the processing device 76 illustrated in FIG. 4 refers to the excavation information database DB stored in the storage device 77, and searches for and selects the first portion state IMt corresponding to the second portion state IMp obtained by the estimation unit 76A, from among the first portion states IMt of the plurality of pieces of excavation information IDG. In an embodiment, the operation determining unit 76B refers to the excavation information IDG in the excavation information database DB, and selects the first portion state IMt similar to the second portion state IMp, as the first portion state IMt corresponding to the second portion state IMp. That is, in an embodiment, the first portion state IMt corresponding to the second portion state IMp is similar to the second portion state IMp. Further, in a case where a first portion state IMt similar to the second portion state IMp does not exist, the operation determining unit 76B may select a closest first portion state IMt, as the first portion state IMt corresponding to the second portion state IMp. In this way, in an embodiment, the operation determining unit 76B determines the selected first portion state IMt as the first portion state IMt corresponding to the second portion state IMp on the basis of the degree of similarity to the second portion state IMp.

Since the first portion state IMt and the first operation ICt are associated with each other in the excavation information IDG, the first operation ICt corresponding to the selected first portion state IMt is determined when the first portion state IMt is selected. Therefore, the operation determining unit 76B can determine the first operation ICt corresponding to the selected state, that is, the first portion state IMt, as a second operation ICp of when the excavation device 30DM excavates the second portion RMp.

The excavation control unit 76C of the processing device 76 illustrated in FIG. 4 operates the excavation device 30DM with the second operation ICp determined by the operation determining unit 76B to excavate the second portion RMp with the bucket 33. The control device 75 executes the above processing and determines the second operation ICp every time the excavation device 30DM of the excavation machine 30 excavates the second portion RMp. Then, the control device 75 operates the excavation device 30DM with the determined second operation ICp to excavate the second portion RMp.

<Excavation Information IDG>

Figure 7:
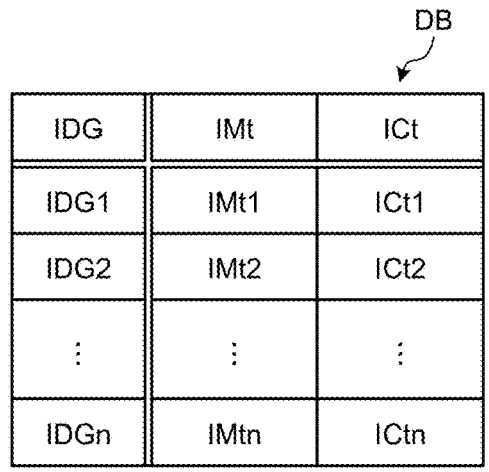
FIG. 7 is a diagram illustrating an example of an excavation information database.

FIG. 6 is a diagram for describing a method of creating the excavation information IDG. FIG. 7 is a diagram illustrating an example of the excavation information database DB. In creating the excavation information IDG in advance, the first portion state IMt and the first operation ICt need to be obtained. Although a method of obtaining the first portion state IMt and the first operation ICt is not limited, in an embodiment, the state of the first portion RMt is detected by the learning front detection device 40Ct, and image processing is applied to obtained image information, so that the first portion state IMt is obtained. Further, an operation of the learning excavation device 30DMt of when an operator OP operates learning excavation device 30DMt to excavate the first portion RMt is employed as the first operation ICt.

The excavation machine 30 is operated by an operation device 20. The operator OP operates a learning excavation machine 30t and the learning excavation device 30DMt, using the operation device 20. The learning excavation device 30DMt and the learning excavation machine 30t are used for generation of the excavation information IDG. However, these device and machine may be used in actual operation in a mine or the like, other than for the generation of the excavation information IDG. The excavation information IDG generated using the learning excavation machine 30t and the learning excavation device 30DMt is used when the excavation machine 30 provided with the excavation device 30DM having at least the same or similar specification automatically performs excavation. In an embodiment, the specification of the excavation device 30DM is at least the lengths of the boom 32a and the arm 32b, and favorably the lengths of the boom 32a, the arm 32b, and the bucket 33.

In an embodiment, the learning excavation machine 30t may be the excavation machine 30 used in actual work. The excavation machine 30 used in actual work may be the learning excavation machine 30t.

In creating the excavation information IDG, first, the first portion RMt is detected using the front detection device 40Ct. To be specific, the front detection device 40Ct images the first portion RMt, and outputs the first portion RMt to the processing device 76 of the control device 75 as image information PCIt. The processing device 76 applies image processing to the image information PCIt to generate the first portion state IMt, and then stores the first portion state IMt to the storage device 77. Next, the operator OP operates the operation device 20 to excavate the first portion RMt with the learning excavation device 30DMt. The operation of the learning excavation device 30DMt during the excavation is stored in the storage device 77 as the first operation ICt.

The first operation ICt includes information that can identify the operation of the excavation device 30DM. Examples of such information include information of variation of hydraulic oil pressure with respect to time provided to the hydraulic cylinders 32C1, 32C2, 32C3, and 32C4, information of variation of the first to fourth stroke sensors 43, 44, 45, and 46 with respect to time, information of variation of the inclination angles θ1, θ2, θ3, and θ4 with respect to time, and information regarding temporal change of the position of the edge 33T of the bucket 33. The first operation ICt includes at least one of the above-described pieces of information. However, the information included in the first operation ICt is not limited to the exemplified information as long as the information can identify the operation of the excavation device 30DM.

When the first portion state IMt and the first operation ICt corresponding to the first portion state IMt are obtained, the processing device 76 generates the information in which the first portion state IMt and the first operation ICt are associated with each other, and employs the information as the excavation information IDG. The generated excavation information IDG is stored in the storage device 77. When one piece of excavation information IDG is obtained, the first portion state IMt and the first operation ICt are generated by the above method for the first portion RMt different from the first portion state IMt included in the obtained excavation information IDG, and is employed as the next excavation information IDG. When the plurality of pieces of excavation information IDG is obtained, the processing device 76 collects the plurality of pieces of excavation information IDG to generate the excavation information database DB illustrated in FIG. 7. The excavation information database DB is stored in the storage device 77. The excavation information database DB illustrated in FIG. 7 includes n (n is an integer of 1 or more) pieces of excavation information IDG.

In an embodiment, the control device 75 of the learning excavation machine 30*t* has created the excavation information IDG and the excavation information database DB. However, these pieces of information may not be generated by the control device 75. For example, the control device 75 illustrated in FIG. 4 transmits the image information PCIt and the first operation ICt of the first portion RMt to the management device 100 illustrated in FIG. 1 through the communication device 52. The management device 100 applies image processing to the image information PCIt of the first portion RMt acquired from the communication device 52 of the learning excavation machine 30*t* to generate the first portion state IMt. Then, the management device 100 associates the first portion state IMt with the first operation ICt corresponding to the first portion state IMt to generates the excavation information IDG, and creates the excavation information database DB from the plurality of pieces of excavation information IDG. In this case, the created excavation information database DB is distributed to the excavation machines 30 through communication or a storage medium, and is stored in the storage devices 77 of the control devices 75.

Further, a terminal device may be connected to the control device 75 provided in the learning excavation machine 30*t*, and this terminal device may generate the excavation information IDG and the excavation information database DB. The excavation information IDG and the excavation information database DB generated by the terminal device are stored in the storage device 77 of the control device 75. In this way, the device that generates the excavation information IDG and the excavation information database DB is not limited. Next, the first portion state IMt will be described. In the next description, the second portion state IMp will also be described for convenience.

<First Portion State IMt and Second Portion State IMp>

Figure 8:
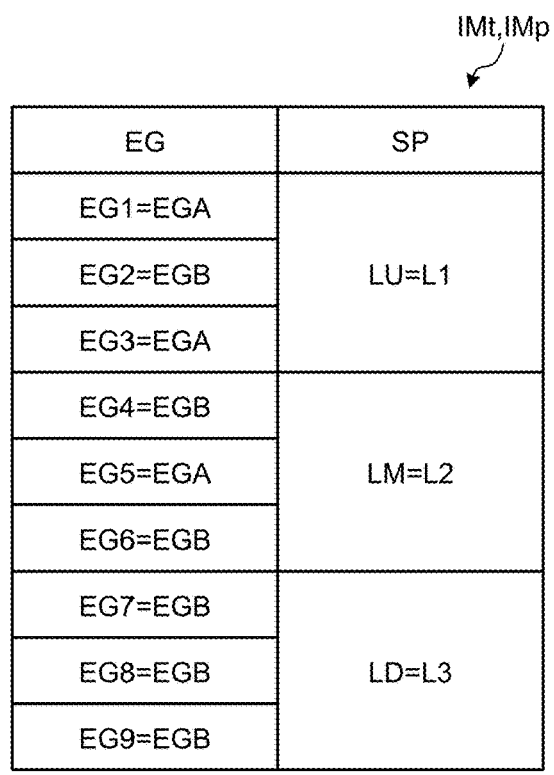
FIG. 8 is a diagram illustrating information included in a first portion state and a second portion state according to an embodiment.
Figure 9:
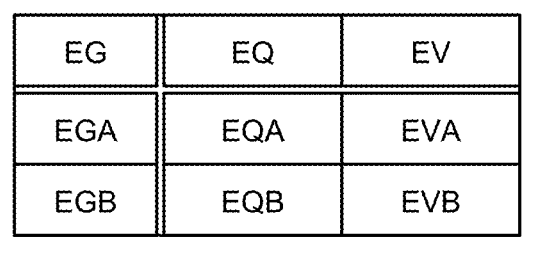

FIG. 8 is a diagram illustrating information included in the first portion state IMt and the second portion state IMp according to an embodiment. FIG. 9 is a diagram illustrating information EG of the particle size distribution of rock, included in the first portion state IMt and the second portion state IMp according to an embodiment. The first portion state IMt and the second portion state IMp include at least one of the information EG of the particle size distribution of the rock MR, and information SP of the shape of the rock mass RM. Hereinafter, the information EG of the particle size distribution of the rock is appropriately referred to as particle size information EG, and the information SP of the shape of the rock mass RM is appropriately referred to as shape information SP. The first portion state IMt and the second portion state IMp are not limited to the particle size information EG and the shape information SP, and may be at least one of the shape of the rock mass RM, the color of the rock mass RM, and the amount of moisture of the rock mass RM. That is, in an embodiment, the first portion state IMt and the second portion state IMp may just be at least one of the particle size information EG, the shape information SP, a shape of the rock MR, information of the color of the rock mass RM, and information of the amount of moisture of the rock mass RM, that is, humidity information. The color of the rock mass RM may be a color of the rock MR, and the amount of moisture of the rock mass RM may be an amount of moisture of the rock MR.

The particle size information EG includes at least one of a quantity of edges EQ extracted from an image of the first portion RMt or the second portion RMp imaged by an imaging device, and a ratio EV of variation of the quantity of edges EQ to variation of a size of a structural element, which has been obtained by varying the size of the structural element used in processing before the edge is extracted. Hereinafter, the quantity of edges EQ is appropriately referred to as edge quantity EQ, and the ratio EV of variation of the quantity of edges EQ is appropriately referred to as edge variation EV. In an embodiment, the particle size information EG expresses the size of the rock MR of the first portion RMt or the second portion RMp by two large and small levels. Particle size information EGA is small and particle size information EGB is large. The particle size information EGA indicates that the rock MR of the first portion RMt or the second portion RMp is relatively small, and the particle size information EGB indicates that the rock MR of the first portion RMt or the second portion RMp is relatively large, that is, larger than the rock MR expressed by the particle size information EGA.

By expressing the size of the rock MR of the first portion RMt or the second portion RMp by the two large and small levels, the amount of information processed by the control device 75 can be decreased. In an embodiment, the size of the rock MR has been expressed by the two large and small levels. However, an embodiment is not limited thereto, and may be three levels, four levels, five levels, or more. By making the number of levels of the size of the rock MR large, the first portion state IMt and the second portion state IMp can be accurately expressed. If the number of levels of the size of the rock MR is made large, a load of the control device 75 also becomes large. Therefore, the number of levels of the size of the rock MR is favorably two or more, and falls within a permissible range of the load of the control device 75.

An edge quantity EQA indicates that the number of edges included in the image of the first portion RMt or the second portion RMp is relatively large. An edge quantity EQB indicates that the number of edges included in the image of the first portion RMt or the second portion RMp is relatively small, that is, smaller than the number of edges indicated by the edge quantity EQA. Edge variation EVA indicates that the ratio of variation of the edge quantity EQ to the variation of the size of the structural element is relatively large. Edge variation EVB indicates that the ratio of variation of the edge quantity EQ to the variation of the size of the structural element is relatively small, that is, smaller than the edge variation EVA.

The particle size information EGA is the edge quantity EQA and the edge variation EVA. The particle size information EGA indicates that the rock MR of the first portion RMt or the second portion RMp is relatively small. Therefore, when the rock MR of the first portion RMt or the second portion RMp is relatively small, the edge quantity EQ becomes relatively large and the edge variation EV becomes relatively large. The particle size information EGB is the edge quantity EQB and the edge variation EVB. The particle size information EGB indicates that the rock MR of the first portion RMt or the second portion RMp is relatively large. Therefore, when the rock MR of the first portion RMt or the second portion RMp is relatively large, the edge quantity EQ becomes relatively small and the edge variation EV becomes relatively small.

In an embodiment, the particle size information EG has been the edge quantity EQ and the edge variation EV. However, the particle size information EG may be one of the edge quantity EQ and the edge variation EV. That is, the particle size information EG may just be at least one of the edge quantity EQ and the edge variation EV.

The shape information SP includes a distance between an imaging device and the rock mass RM. The shape information SP is information of a cross section shape of when the rock mass RM is cut by a plane parallel to a direction going from the excavation machine 30 toward the rock mass RM and perpendicular to the ground G. In an embodiment, the imaging device is the front detection device 40C illustrated in FIGS. 1 and 6. Next, the particle size information EG will be described in more detail.

Figure 10:
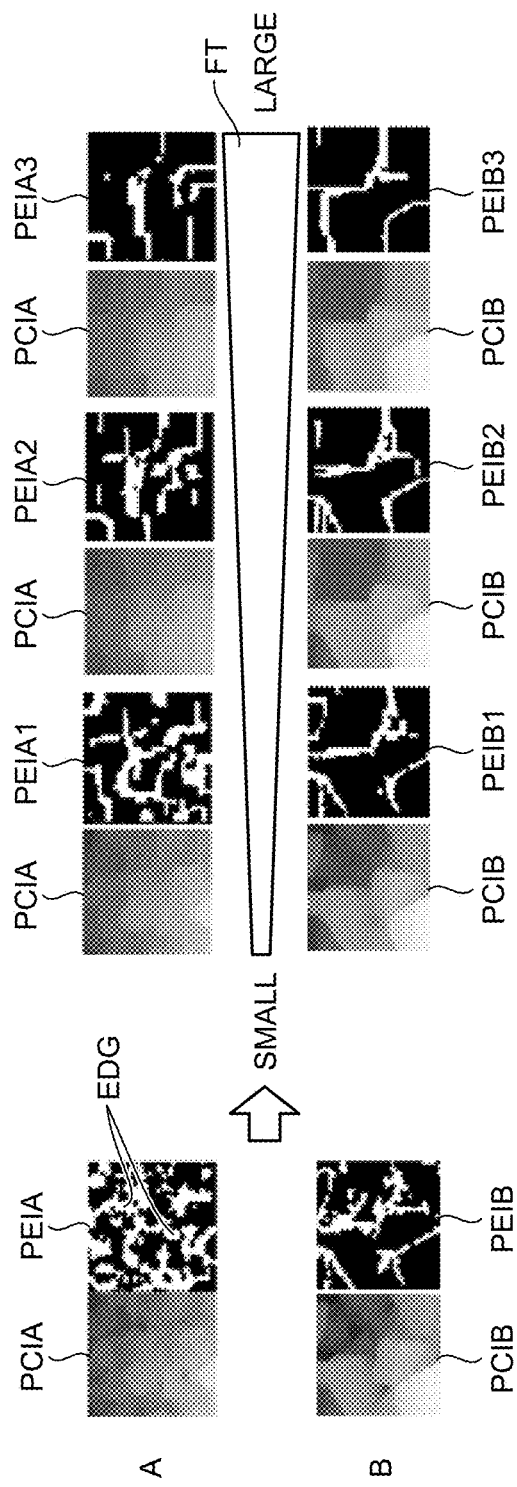
FIG. 10 is a diagram for describing a method of generating particle size information.
Figure 11:
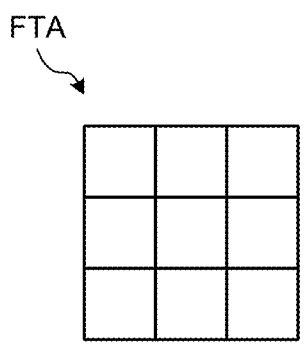
FIG. 11 is a diagram illustrating an example of a structural element used in processing before an edge of an image is extracted.
Figure 12:
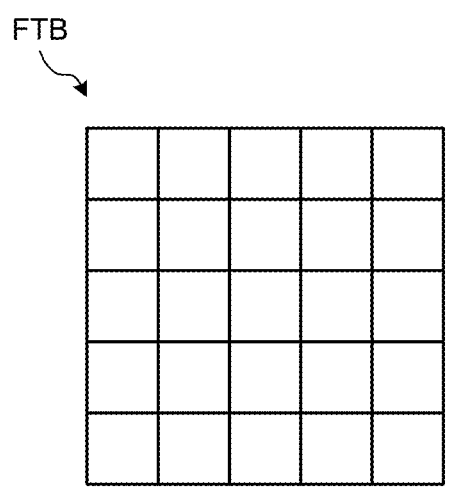
FIG. 12 is a diagram illustrating an example of a structural element used in processing before an edge of an image is extracted.
Figure 13:
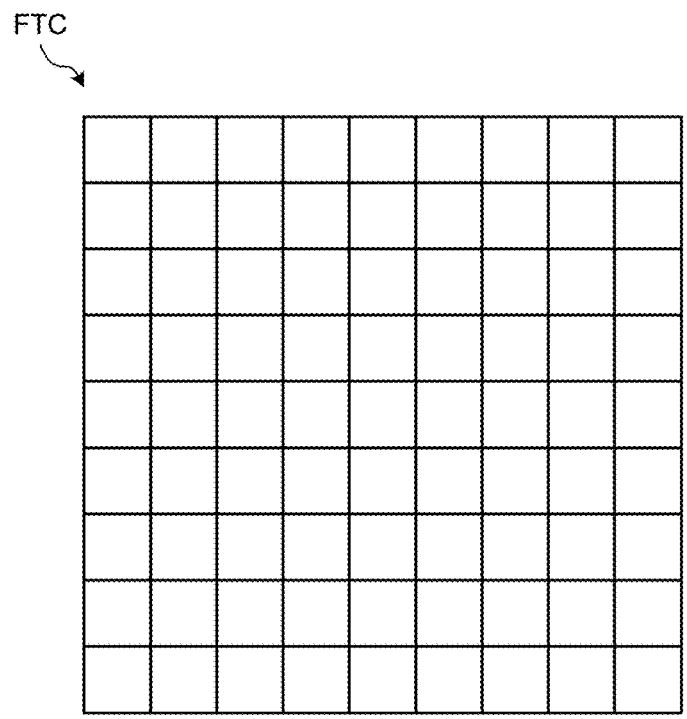
FIG. 13 is a diagram illustrating an example of a structural element used in processing before an edge of an image is extracted.

FIG. 10 is a diagram for describing a method of generating the particle size information EG. FIGS. 11 to 13 are diagrams illustrating examples of a structural element used in processing before an edge of an image is extracted. In the next description, an example in which the processing device 76 of the control device 75 illustrated in FIG. 4 generates the particle size information EG will be described. However, the particle size information EG may be generated by a device other than the processing device 76.

The particle size information EG is obtained from the image of the first portion RMt or the second portion RMp detected by the front detection device 40C as an imaging device. In the next description, the image of the first portion RMt or the second portion RMp is represented by the sign PCI, for convenience. The signs A and B affixed to the sign PCI indicate that imaged portions are different. The sign A indicates that the rock MR is relatively a small portion, and the sign B indicates that the rock MR is relatively a large portion, that is, a portion larger than the rock MR of the portion represented by the sign A. What is obtained from an image PCIA is the particle size information EGA, that is, the edge quantity EQA and the edge variation EVA. What is obtained from an image PCIB is the particle size information EGB, that is, the edge quantity EQB and the edge variation EVB. When the image PCIA and the image PCIB are not distinguished, they are referred to as images PCI.

Figure 14:
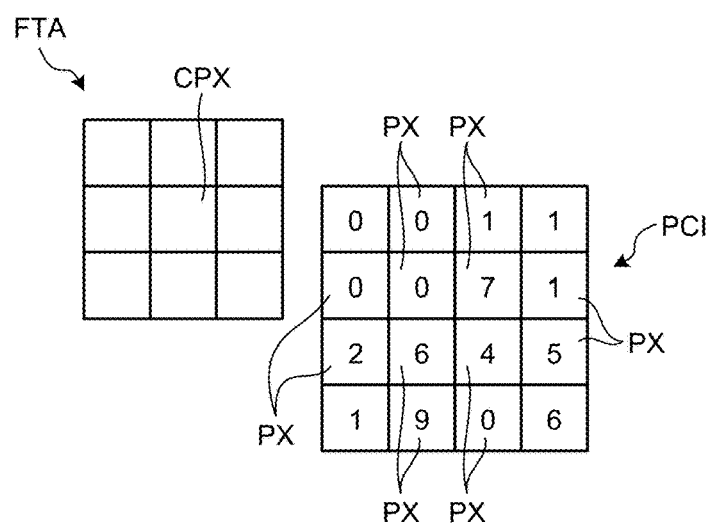
FIG. 14 is a diagram illustrating examples of a structural element and an image to which image processing is applied.

FIG. 14 is a diagram illustrating examples of a structural element FTA and an image PCI to which image processing is applied. FIG. 15-1 is a diagram illustrating a result of expansion calculation applied to the image PCI, using the structural element FTA. FIG. 15-2 is a diagram illustrating a result of contraction calculation applied to the image PCI, using the structural element FTA. Opening processing is processing of executing the contraction calculation a certain number of times and then executing the expansion calculation by the same number of times as the contraction calculation to obtain an image. Closing processing is processing of executing the expansion calculation a certain number of times and then executing the contraction calculation by the same number of times as the expansion calculation to obtain an image. The processing device 76 applies the closing processing to the image PCI to be processed after applying the opening processing. The opening processing and the closing processing are processing before an edge EDG is extracted. The closing processing is applied after the opening processing is applied, so that a fine pattern is removed from the image PCI to be processed. The processing device 76 extracts the edge EDG from the processing image to which the closing processing has been applied after the opening processing was applied.

In the expansion calculation, regarding the structural element FTA, a pixel PX to be calculated of the image PCI and a central pixel CPX of the structural element FTA are brought to overlap with each other, and a maximum value of values of the central pixel CPX and nine pixels PX of the image PCI, the nine pixels existing around the central image CPX, is output as a value of the pixel PX to be calculated of the image PCI. When the above-described calculation is applied to all the pixels PX of the image PCI, an expansion calculation image PCIO illustrated in FIG. 15-1 is obtained. In a case of applying the expansion calculation to the image PCI, using a five-pixel square structural element FTB, the structural element FTB outputs a maximum value of values of twenty four pixels PX included in the image PCI, the twenty four pixels existing around the central pixel CPX, as a value of the pixel PX to be calculated of the image PCI. In a case of applying the expansion calculation to the image PCI, using a nine-pixel square structural element FTC, the structural element FTC outputs a maximum value of values of eighty pixels PX included in the image PCI, the eighty pixels existing around the central pixel CPX, as a value of the pixel PX to be calculated of the image PCI.

In the contraction calculation, regarding the structural element FTA, the pixel PX to be calculated of the image PCI and the central pixel CPX of the structural element FTA are brought to overlap with each other, and a minimum value of values of the central pixel CPX and eight pixels PX included in the image PCI, the eight pixels existing around the central pixel CPX, is output as a value of the pixel PX to be calculated of the image PCI. When the above-described calculation is applied to all the pixels PX of the image PCI, a contraction calculation image PCIC illustrated in FIG. 15-2 is obtained. In a case of applying the contraction calculation to the image PCI, using the five-pixel square structural element FTB, the structural element FTB outputs a minimum value of values of twenty four pixels PX included in the image PCI, the twenty four pixels existing around the central pixel CPX, as a value of the pixel PX to be calculated of the image PCI. In a case of applying the contraction calculation to the image PCI, using the nine-pixel square structural element FTC, the structural element FTC outputs a minimum value of values of eighty pixels PX included in the image PCI, the eighty pixels existing around the central pixel CPX, as a value of the pixel PX to be calculated of the image PCI.

As illustrated in FIG. 14, the image PCI that is an object of image processing of an embodiment is expressed by 10-gradation grayscale. The number of gradation of the grayscale is not limited. Further, the opening processing and the closing processing may be applied to an image obtained by applying banalization processing to the image PCI, and then the edge EDG may be extracted.

For the opening processing and the closing processing, the structural elements FTA, FTB, and FTC illustrated in FIGS. 11 to 13 are used. The structural element FTA is a three-pixel square structural element, the structural element FTB is a five-pixel square structural element, and the structural element FTC is a nine-pixel square structural element. When the structural elements FTA, FTB, and FTC are not distinguished, they are appropriately referred to as structural elements FT. In an embodiment, the structural elements FT used to extract the edge EDG from the image PCI are not limited to the sizes and shapes of the embodiment as long as the structural elements FT are a plurality of structural elements FT having different sizes. For example, the structural element FTB may be a ten-pixel square structural element, and the structural element FTC may be a twenty-pixel square structural element. At least two structural elements FT having different sizes may just be needed because edge variation of when the size or the shape of the structural element FT is varied is paid attention.

The image PCI of the first portion RMt or the second portion RMp detected by the front detection device 40C is configured from a plurality of pixels. In an embodiment, the processing device 76 extracts an edge from the image after the processing, after the opening processing and the closing processing are applied to the image PCI. In the next description, the image from which an edge is extracted is represented by the sign PEI. An image PEI from which an edge is extracted is appropriately referred to as edge image PEI. The sign A affixed to the sign PEI corresponds to the image PCIA, and the sign B corresponds to the image PCIB. The FIGS. 1 to 3 affixed to the signs A and B indicate the size of the structural element used for the opening processing and the closing processing. The structural element becomes larger as the figure affixed to the signs A and B becomes larger. The edge EDG is a white portion in the edge image PEI.

FIG. 15-3 is a diagram illustrating an example of processing of extracting the edge EDG. FIG. 15-4 is a diagram illustrating examples of intermediate edge images PEIx and PEIy. FIG. 15-5 is a diagram illustrating an example of the edge image PEI. A processed image to which the closing processing has been applied after the opening processing was applied is referred to as intermediate image PCIi. The processing device 76 extracts the edge EDG from the intermediate image PCIi illustrated in FIG. 15-3. In an embodiment, the processing device 76 extracts the edge EDG from the intermediate image PCIi, using edge extraction filters FTPx and FTPy illustrated in FIG. 15-3. In an embodiment, the edge extraction filters FTPx and FTPy are 3×3 filters, and extract a portion having large luminance variation, of the pixels PX included in the intermediate image PCIi, as the edge EDG.

The processing device 76 multiplies numerical values of the edge extraction filters FTPx and FTPy and numerical values of the pixels PX of the intermediate image PCIi overlapping with the edge extraction filters FTPx and FTPy in a state where the pixel PX to be calculated of the intermediate image PCIi and central pixels CPXa of the edge extraction filters FTP are brought to overlap with each other. Then, the processing device 76 outputs a sum of results of the multiplication, as a value of the pixel PX to be calculated of the intermediate image PCIi, that is, a value of the pixel PX overlapping with the central pixels CPXa of the edge extraction filters FTPx and FTPy.

When the calculation with the edge extraction filters FTP for all the pixels PX of the intermediate image PCIi is terminated, two intermediate edge images PEIx and PEIy illustrated in FIG. 15-4 are obtained. The processing device 76 obtains average values of the numerical values of the corresponding pixels PX of the two intermediate edge images PEIx and PEIy, and outputs the values of the pixels PX of the edge image PEI illustrated in FIG. 15-5. When the average values of all the pixels PX of the two intermediate edge images PEIx and PEIy are obtained, the edge image PEI illustrated in FIG. 15-5 is obtained.

The processing device 76 identifies the pixel PX serving as the edge EDG on the basis of the values of the pixels PX of the edge image PEI, and a threshold for extracting the edge EDG. In this way, the edge EDG is extracted from the image PCI. In an embodiment, the processing device 76 further applies expansion processing to the edge EDG. The application of expansion processing to the edge EDG is not essential.

The processing device 76 applies the opening processing and the closing processing, using the plurality of structural elements FTA, FTB, and FTC, to obtain the plurality of intermediate images PCIi, and the edge images PEI are obtained from the respective intermediate images PCIi, using the edge extraction filters FTP. In an embodiment, an edge image PEIA1 and an edge image PEIB1 are obtained with the structural element FTA and the edge extraction filters FTP, an edge image PEIA2 and an edge image PEIB2 are obtained with the structural element FTB and the edge extraction filters FTP, and an edge image PEIA3 and an edge image PEIB3 are obtained with the structural element FTC and the edge extraction filters FTP. In an embodiment, as the edge extraction filters FTP, prewitt filters have been used. However, the edge extraction filters FTP are not limited thereto, and canny filters or sobel filters may be used. In this way, the edge extraction filters FTP and the method of obtaining the edge image PEI are not limited to the above method.

When the processing device 76 obtains the edge images PEIA1, PEIA2, and PEIA3 from the image PCIA, and the edge images PEIB1, PEIB2, and PEIB3 from the image PCIB, the processing device 76 obtains the edge quantities EQ and the edge variations EV from the respective edge images and generates the particle size information EG. Hereinafter, when the edge images PEIA1, PEIA2, PEIA3, PEIB1, PEIB2, and PEIB3 are not distinguished, they are referred to as edge images PEI.

The processing device 76 obtains the edge quantities EQ and the edge variations EV of the edge images PEI. The edge quantity EQ is a ratio of the number of pixels extracted as the edge EDG to the number of all the pixels of the edge image PEI. In obtaining the edge variation EV, the processing device 76 obtains a first difference value AEQ1 by subtracting the edge quantity EQ of the edge image PEI obtained with the structural element FTA from the edge quantity EQ of the edge image PEI obtained with the structural element FTB. Further, the processing device 76 obtains a second difference value AEQ2 by subtracting the edge quantity EQ of the edge image PEI obtained with the structural element FTB from the edge quantity EQ of the edge image PEI obtained with the structural element FTC. The processing device 76 uses a larger one of the first difference value AEQ1 and the second difference value AEQ2, as the edge variation EV of the image PCI. Other than the above, the processing device 76 may use a smaller one of the first difference value AEQ1 and the second difference value AEQ2, as the edge variation EV of the image PCI, may use an average value of the first difference value AEQ1 and the second difference value AEQ2, as the edge variation EV of the image PCI, or may use both the first difference value AEQ1 and the second difference value AEQ2. The differences of the edge images PEI obtained with the different structural elements FT, the differences being candidates for the edge variation EV, are not limited to those described above.

In an embodiment, the edge variation EV is obtained by extracting the edge EDG from the images PCI, using the structural elements FT, and making the structural elements FT used for the edge EDG large. The edge variation EV is obtained by varying strength of processing of removing a fine pattern. Therefore, the method is not limited as long as the method can remove the fine pattern. For example, the fine pattern may be removed by blurring processing.

In an embodiment, as described above, the particle size information EG is classified into the two levels of the particle size information EGA and the particle size information EGB. Therefore, the processing device 76 classifies the obtained edge quantity EQ and the obtained edge variation EV into the two levels, using an edge quantity threshold EQc and an edge variation threshold EVc. When the obtained edge quantity EQ is the edge quantity threshold EQc or more, the processing device 76 classifies the obtained edge quantity EQ into the edge quantity EQA. When the obtained edge quantity EQ is less than the edge quantity threshold EQc, the processing device 76 classifies the obtained edge quantity EQ into the edge quantity EQB. When the obtained edge variation EV is the edge variation threshold EVc or more, the processing device 76 classifies the obtained edge variation EV into the edge variation EVA. When the obtained edge variation EV is less than the edge variation threshold EVc, the processing device 76 classifies the obtained edge variation EV into the edge variation EVB.

As illustrated in FIG. 10, when the particle size of the rock MR is relatively small, the edge quantity EQ of the edge EDG extracted from the image PCI becomes large. Further, as illustrated in FIG. 10, when the particle size of the rock MR is relatively small, the edge variation EV of the edge EDG extracted from the image PCI becomes larger as the structural elements FT become larger in order of FTA, FTB, and FTC. That is, when the particle size of the rock MR is relatively small, the edge variation EV becomes large. In an embodiment, the particle size information EG of the first portion RMt or the second portion RMp is classified using the edge quantity EQ and the edge variation EV.

When the edge quantity EQ of the first portion RMt or the second portion RMp is the edge quantity EQA, and the edge variation EV is the edge variation EVA, the particle size information EG becomes the particle size information EGA. In this case, the rock MR of the first portion RMt or the second portion RMp has a relatively small particle size. When the edge quantity EQ of the first portion RMt or the second portion RMp is the edge quantity EQB, and the edge variation EV is the edge variation EVB, the particle size information EG becomes the particle size information EGB. In this case, the rock MR of the first portion RMt or the second portion RMp has a relatively large particle size. In this way, the particle size information EG of the first portion RMt or the second portion RMp is classified into the particle size information EGA or the particle size information EGB.

Next, the shape information SP will be described.

Figure 16:
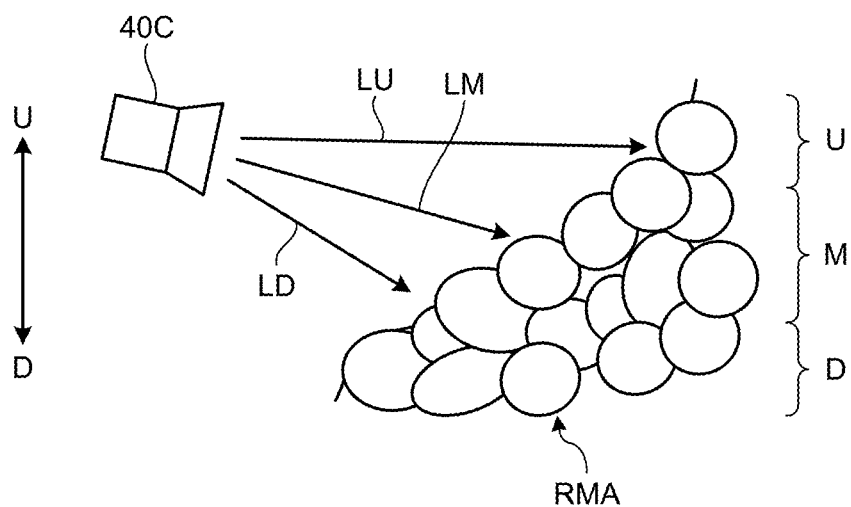
FIG. 16 is a diagram for describing shape information.
Figure 17:
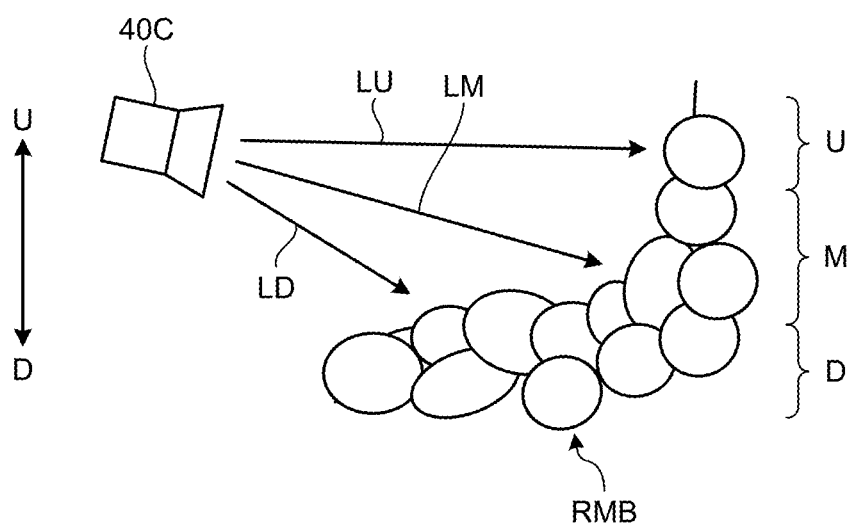
FIG. 17 is a diagram for describing shape information.
Figure 18:
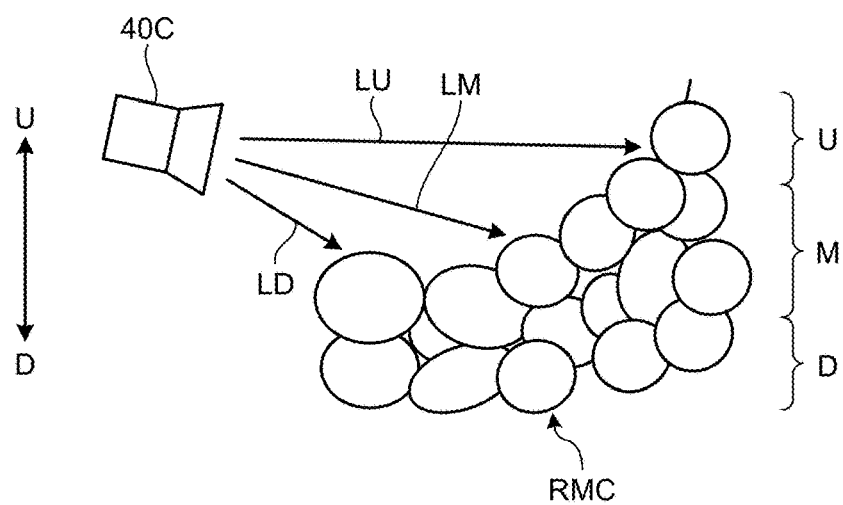
FIG. 18 is a diagram for describing shape information.

FIGS. 16 to 18 are diagrams for describing the shape information. The image PCI of the first portion RMt or the second portion RMp detected by the front detection device 40C includes luminance information in each of the pixels. In this case, the image PCI is a distance image. The luminance of the pixels corresponds to the distance from the front detection device 40C. Therefore, distances from the front detection device 40C to the pixels can be obtained by obtaining the luminance of the pixels of the image PCI.

In an embodiment, the processing device 76 obtains distances from the front detection device 40C in three places of an upper portion U, a central portion M, and a lower portion D of rock masses RMA, RMB, and RMC illustrated in FIGS. 16 to 18. The distance from the front detection device 40C to the upper portion U is LU, the distance from the front detection device 40C to the central portion M is LM, and the distance from the front detection device 40C to the lower portion D is LD.

The shape information SP includes the distance LU, the distance LM, and the distance LD. The rock mass RMB has the larger distance LM of the central portion M than the rock mass RMA. Therefore, the rock mass RMB can be determined to have a shape with a depressed central portion M. The rock mass RMC has the smaller distance LM of the central portion M and the distance LD of the lower portion D than the rock mass RMA. Therefore, the rock mass RMC can be determined to have a shape with the rising central portion M and lower portion D. In this way, the shapes, to be specific, the above-described cross section shapes, of the rock masses RMA, RMB, and RMC can be expressed by the distance LU, the distance LM, and the distance LD. Therefore, the shape information SP can be used as information for distinguishing the rock mass RM, that is, the first portion RMt or the second portion RMp.

Figure 19:
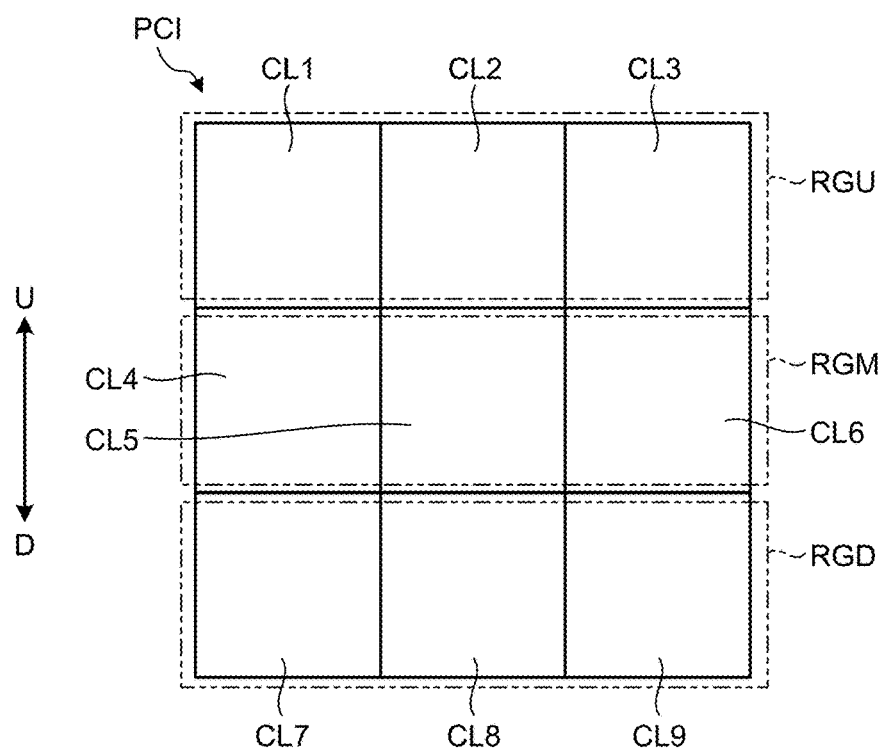
FIG. 19 is a diagram illustrating an example of an image divided into a plurality of regions.

FIG. 19 is a diagram illustrating an example in which the image PCI is divided into a plurality of regions. In an embodiment, the image PCI of the first portion RMt or the second portion RMp is divided into a plurality of regions, and the particle size information EG and the shape information SP are obtained for each divided region. In an embodiment, the image PCI is divided into nine regions CL1 to CL9. Further, an up and down direction UD of the image PCI is divided into an upper portion region RGU, a central region RGM, and a lower portion region RGD. In an embodiment, the up and down direction UD of the image PCI corresponds to an up and down direction of the excavation machine 30. The regions CL1 to CL3 correspond to the upper portion region RGU, the regions CL4 to CL6 correspond to the central region RGM, and the regions CL7 to CL9 correspond to the lower portion region RGD. Hereinafter, the regions CL1 to CL9 are appropriately referred to as cells CL1 to CL9.

The processing device 76 obtains the particle size information EG for each of the cells CL1 to CL9, and obtains the shape information SP for each of the upper portion region RGU, the central region RGM, and the lower portion region RGD. In an embodiment, the distance LU included in the shape information SP is an average value of the distances from the front detection device 40C to the respective pixels included in the upper portion region RGU. The distance LM included in the shape information SP is an average value of the distances from the front detection device 40C to the respective pixels included in the central region RGM. The distance LD included in the shape information SP is an average value of the distances from the front detection device 40C to the respective pixels included in the lower portion region RGD.

The processing device 76 may obtain the particle size information EG and the shape information SP for each pixel of the image PCI. However, as described above, the processing device 76 can obtain the particle size information EG for each of the cells CL1 to CL9, and obtain the shape information SP for each of the upper portion region RGU, the central region RGM, and the lower portion region RGD, thereby to decrease the amount of information. As a result, the load of calculation of the processing device 76 can be decreased, and an increase in use area of the storage device 77 can be suppressed. In this way, the image PCI is divided into the plurality of regions, and the particle size information EG and the shape information SP are obtained for each region, whereby the load of hardware resources can be reduced.

In an embodiment, the number of the cells CL1 to CL9 is nine. However, the number of cells is not limited to nine. The number of divisions of the up and down direction UD of the image PCI is also not limited to three.

The first portion state IMt or the second portion state IMp illustrated in FIG. 8 includes the particle size information EG obtained for each of the cells CL1 to CL9, and the shape information SP obtained for each of the upper portion region RGU, the central region RGM, and the lower portion region RGD. In the example illustrated in FIG. 8, the pieces of particle size information EG of the cells CL1 to CL9 are pieces of particle size information EG1 to EG9, respectively, and the distance of the upper portion region RGU is LU, the distance of the central region RGM is LM, and the distance of the lower portion region RGD is LD. The first portion state IMt or the second portion state IMp illustrated in FIG. 8 is defined and identified by the particle size information EG of the cells CL1 to CL9, and the shape information SP of the upper portion region RGU, the central region RGM, and the lower portion region RGD.

For example, if the particle size information EG of the cells CL1 to CL9, and the shape information SP of the upper portion region RGU, the central region RGM, and the lower portion region RGD are the same between the first portion state IMt and the second portion state IMp, the first portion RMt corresponding to the first portion state IMt and the second portion RMp corresponding to the second portion state IMp can be determined to be the same particle size distribution and shape. Further, if the particle size information EG of the cells CL1 to CL9, and the shape information SP of the upper portion region RGU, the central region RGM, and the lower portion region RGD are not the same between the first portion state IMt and the second portion state IMp, the first portion state IMt and the second portion state IMp can be determined to be similar if a rate of concordance exceeds a threshold determined in advance, for example.

Figure 20:
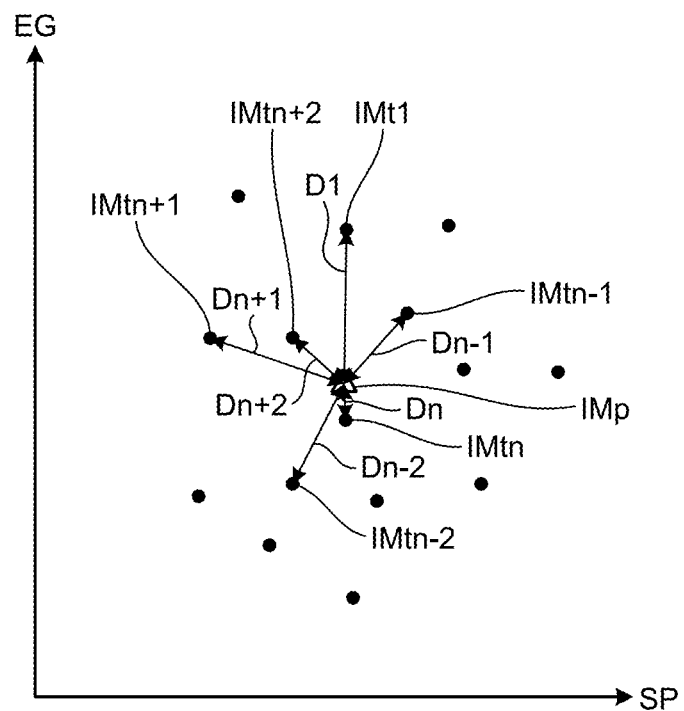
FIG. 20 is a diagram for describing a method of selecting a first portion state corresponding to a second portion state in an embodiment.

FIG. 20 is a diagram for describing a method of selecting the first portion state IMt corresponding to the second portion state IMp in an embodiment. The operation determining unit 76B illustrated in FIG. 4 selects the first portion state IMt corresponding to the second portion state IMp obtained by the estimation unit 76A, from among the first portion states IMt of the plurality of pieces of excavation information IDG. At this time, the operation determining unit 76B refers to the excavation information IDG, to be more specific, the excavation information database DB, and selects the first portion state IMt similar to the second portion state IMp obtained by the estimation unit 76A.

In an embodiment, the operation determining unit 76B selects the first portion state IMt corresponding to the second portion state IMp from among the plurality of first portion states IMt, using a K-nearest neighbor algorithm (K-NN) method, for example. The K-NN method is an algorithm for selecting neighbor data in a characteristic space.

In FIG. 20, the vertical axis represents the particle size information EG, the horizontal axis represents the shape information SP, and a plurality of first portion states IMt1, IMtn−2, IMtn−1, IMtn, IMtn+1, IMtn+2, and the like exists around the second portion state IMp. n is an integer of 1 or more. In this case, the operation determining unit 76B selects the first portion state IMt corresponding to the second portion state IMp, in an embodiment, the most similar first portion state IMt, on the basis of the degree of similarity to the second portion state IMp. In an embodiment, the most similar first portion state IMt to the second portion state IMp is selected on the basis of the distance D between the second portion state IMp and the first portion state IMt. In this way, in an embodiment, the distance D between the second portion state IMp and the first portion state IMt is used as the degree of similarity that indicates the degree of similarity between the second portion state IMp and the first portion state IMt.

The distance D is expressed by the formula (1). 1, n−2, n−1, n, n+1, and n+2 affixed to the distance D in FIG. 20 are signs for identifying the first portion states IMt. The first portion state IMt and the second portion state IMp each include the pieces of particle size information EG and shape information SP. k affixed to the first portion state IMt indicates an integer of 1 or more, and that the first portion state IMt in calculating the distance D is the k-th first portion state IMt.

$$D = \sqrt{(IMp - IMtk)^2} \quad (1)$$

The operation determining unit 76B selects the first portion state IMtn having the distance Dn that is the smallest distance D between the second portion state IMp and the first portion state IMt, as the first portion state IMt most similar to the second portion state IMp. However, the method of selecting the first portion state IMt is not limited thereto. The operation determining unit 76B may select a plurality of the first portion states IMt similar to the second portion state IMp. In this case, the operation determining unit 76B may select the plurality of first portion states IMt in descending order of similarity to the second portion state IMp, that is, in ascending order of the distance D.

When the operation determining unit 76B selects the first portion state IMt corresponding to the second portion state IMp, the operation determining unit 76B determines the first operation ICt corresponding to the selected first portion state IMt, as the second operation ICp of when the excavation device 30DM excavates the second portion RMp. The excavation control unit 76C automatically operates the excavation device 30DM with the second operation ICp determined by the operation determining unit 76B. In a case where the operation determining unit 76B selects the plurality of first portion states IMt, the second operation ICp is determined using the plurality of first operations ICt. In this case, the operation determining unit 76B may determine an averaged operation of the plurality of first operations ICt, as the second operation ICp. In doing so, if the state of the rock mass RM varies in some degree, substantial variation of the operation of the excavation device 30DM is suppressed. Therefore, the excavation machine 30 can stably operate the excavation device 30DM. Further, the operation determining unit 76B determines the second operation ICp from the plurality of first operations ICt having high productivity, for example, the plurality of first operation ICt having a large excavation quantity, whereby the second operation ICp having high productivity can be more easily obtained. Further, in a case where the operation determining unit 76B does not have learned data according to the state of the current rock mass RM (including the shape and particle size distribution of the rock mass RM) but the current state is well matched with a state of a rock mass RM of certain learned data when moving parallel to the entire rock mass RM, the operation determining unit 76B may correct an excavation start position of the second operation ICp. In doing so, the excavation machine 30 can easily realize excavation with high productivity even if the amount of excavation information IDG stored in the excavation information database DB is small.

The excavation machine 30 operates the excavation device 30DM to excavate the second portion RMp with the first operation ICt of when the first portion state IMt is excavated, the first portion state IMt being closest to the second portion state IMp of the second portion RMp intended to be excavated, that is, the second operation ICp. In this way, the operation of when the portion of the state is excavated, the state being closest to the state of the portion intended to be excavated, is applied to the excavation machine 30. Therefore, the excavation machine 30 can appropriately and reliably execute automatic excavation. Further, the excavation device 30DM can automatically excavate the second portion RMp, using the second operation ICp suitable for the excavation of the second portion RMp. Therefore, excavation efficiency is improved. Further, the excavation device 30DM is operated with the second operation ICp determined from the first operation ICt obtained by an operation of the operator. Therefore, the first operation ICt is set by the operation of the experienced operator OP, whereby the control device 75 of the excavation machine 30 can reflect the operation of the experienced operator OP to the operation of the excavation device 30DM. As a result, the excavation machine 30 can realize efficient excavation.

<Control Example>

Figure 21:
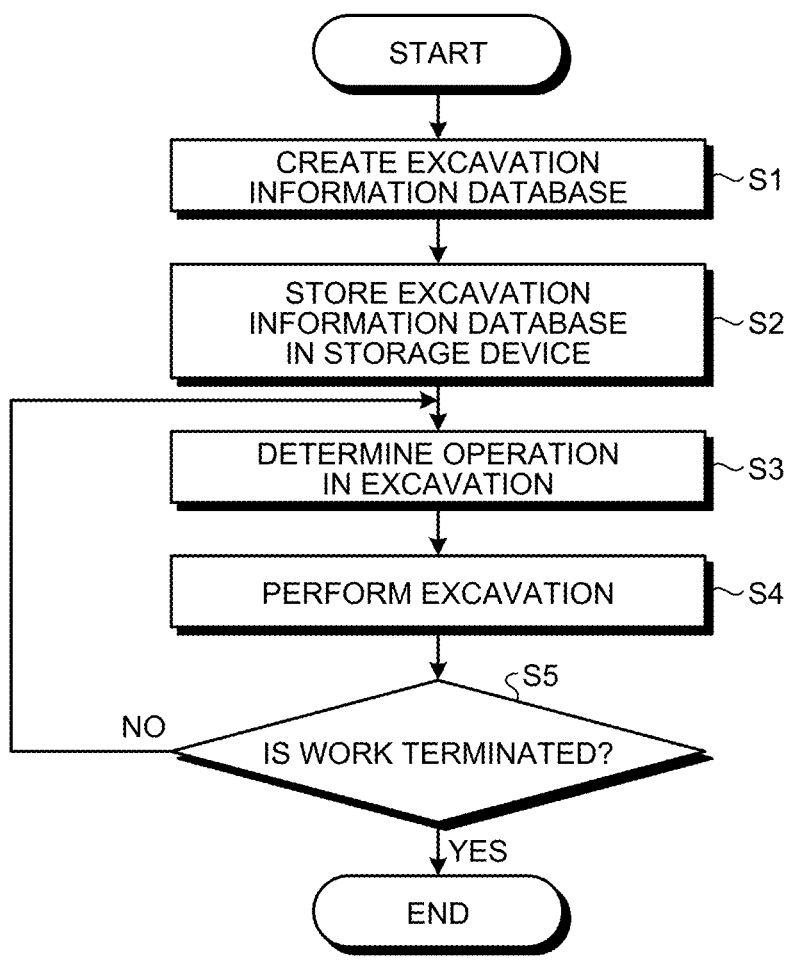
FIG. 21 is a flowchart illustrating an example of a method of controlling an excavation machine according to an embodiment.

FIG. 21 is a flowchart illustrating an example of a method of controlling the excavation machine according to an embodiment. In step S1, the excavation information database DB is created. The excavation information database DB includes the plurality of pieces of excavation information IDG. Creation of the excavation information IDG is as described above. In step S2, the created excavation information database DB is stored in the storage device 77 of the control device 75 illustrated in FIG. 4.

In step S3, the processing device 76 determines the operation at the time of excavation by the excavation device 30DM, that is, the second operation ICp. In determining the second operation ICp, the estimation unit 76A obtains the second portion state IMp of the second portion RMp detected by the front detection device 40C. Then, the operation determining unit 76B refers to the excavation information database DB, selects the first portion state IMt corresponding to the second portion state IMp, and determines the first operation ICt corresponding to the selected first portion state IMt, as the second operation ICp.

Next, in step S4, the excavation control unit 76C operates the excavation device 30DM with the determined second operation ICp to excavate the second portion RMp. In step S5, when the work has been terminated (step S5, Yes), the processing device 76 terminates the control of the excavation machine 30. When the work has not yet been terminated (step S5, No), the processing device 76 returns to step S3, and executes processing from step S3.

Figures 1, 22:
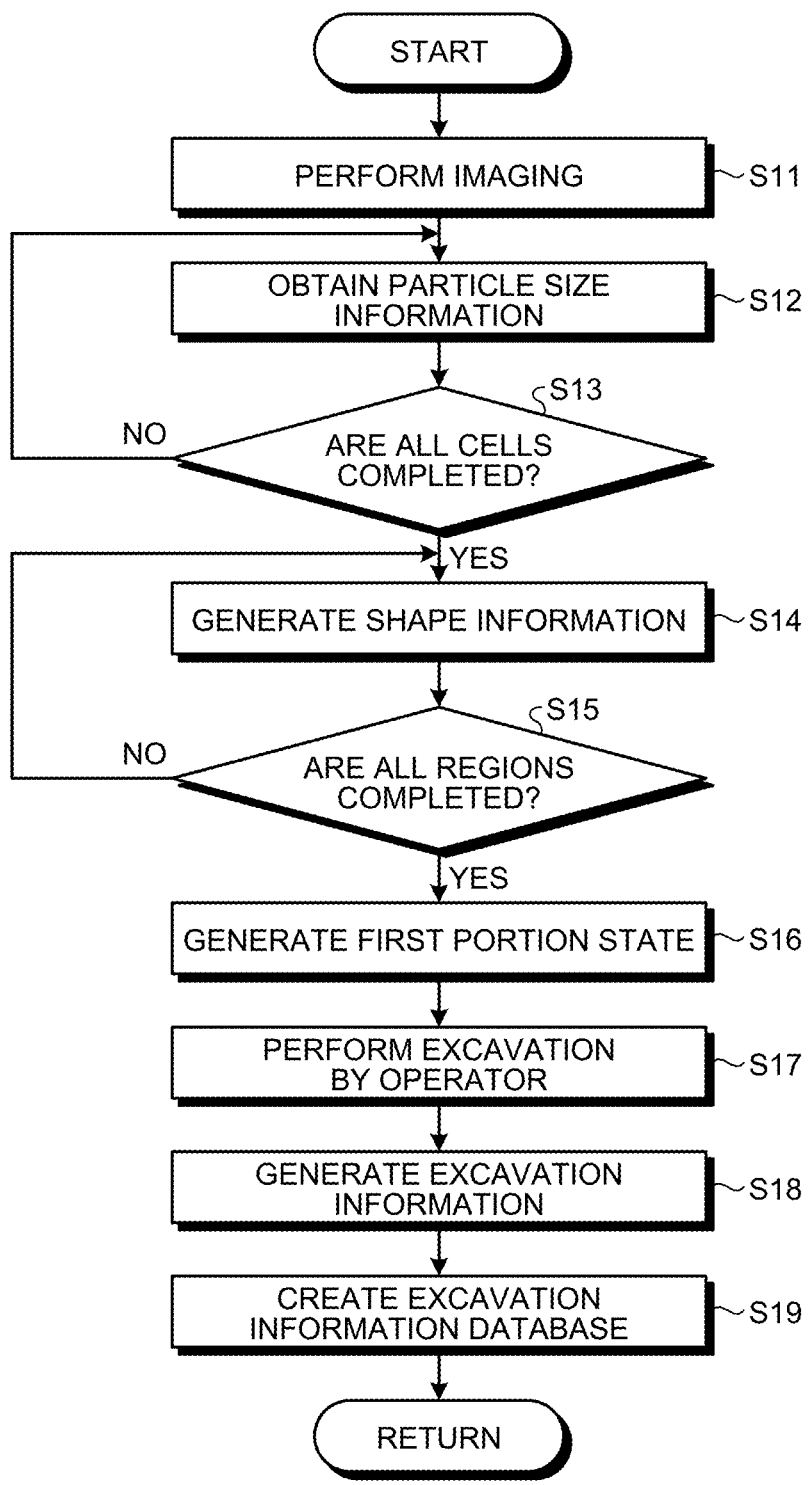
Figures 2, 22:
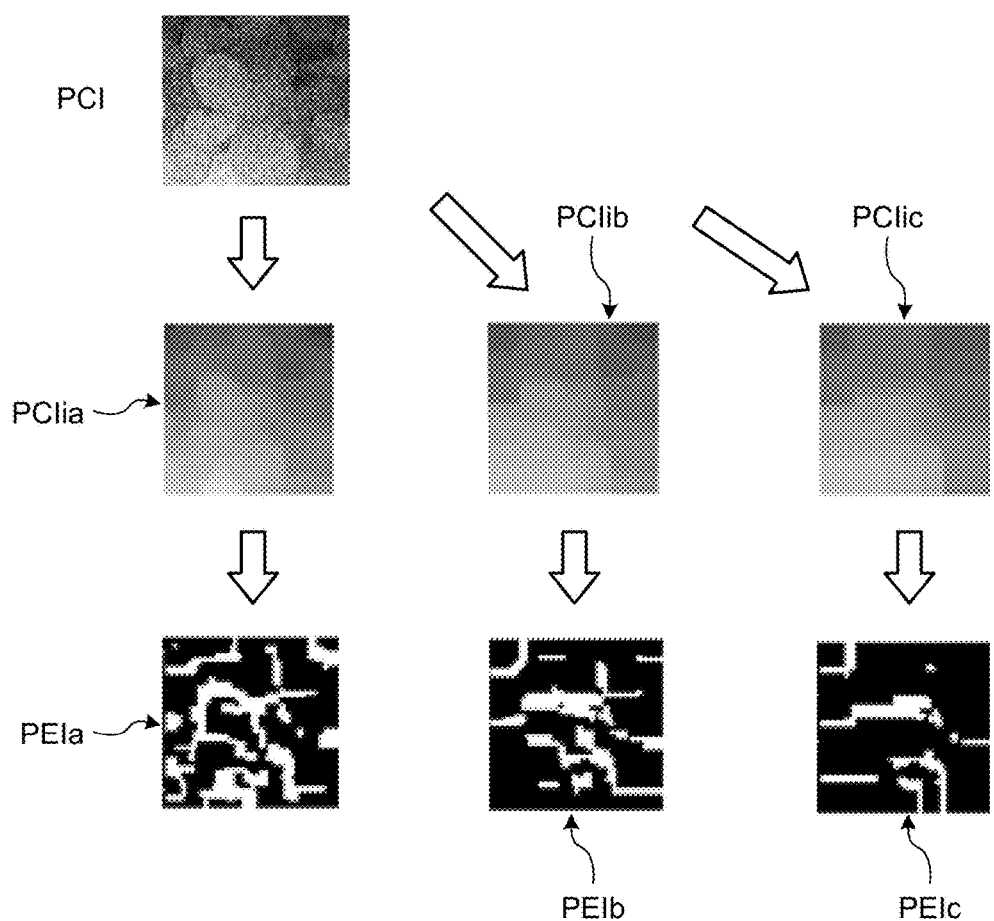

FIG. 22-1 is a flowchart illustrating an example of a procedure of generating the excavation information database DB. FIG. 22-2 is a diagram illustrating an example of a procedure of extracting the edge EDG. In creating the excavation information database DB, in step S11, the learning front detection device 40Ct images the first portion RMt. In step S12, the processing device 76 obtains the particle size information EG about respective cells included in the image PCI of the first portion RMt. In step S13, in a case where the particle size information EG has not been obtained about all the cells of the image PCI (step S13, No), the processing device 76 returns to step S12 and obtains the particle size information EG.

In obtaining the particle size information EG, the processing device 76 applies the opening processing and then the closing processing to the image PCI to be processed, using the structural elements FTA, FTB, and FTC, to obtain three intermediate images PCIia, PCIib, and PCIic. Next, the processing device 76 extracts the edges EDG from the respective intermediate images PCIia, PCIib, and PCIic, using the edge extraction filters FTP, to obtain three edge images PEIa, PEIb, and PEIc. The processing device 76 obtains the edge quantity EQ and the edge variation EV from the respective edge images PEIa, PEIb, and PEIc to generate the particle size information EG.

When the particle size information EG has been obtained about all the cells (step S13, Yes), the processing device 76 generates the shape information SP of the first portion RMt in step S14. In step S15, in a case where the shape information SP has not yet been generated about all the regions of the image PCI (step S15, No), the processing device 76 returns to step S14, and generates the shape information SP. When the shape information SP has been generated about all the regions of the image PCI (step S15, Yes), the processing device 76 advances the processing to step S16.

In step S16, the processing device 76 generates the first portion state IMt, using the particle size information EG and the shape information SP. Next, in step S17, the operator OP operates the learning excavation device 30DMt to excavate the rock mass RM, to be specific, the first portion RMt. The operation of the learning excavation device 30DMt at this time is the first operation ICt. Next, in step S18, the processing device 76 generates the excavation information IDG from the first portion state IMt and the first operation ICt. The processing device 76 repeats steps S11 to S18 described above to generate the plurality of pieces of excavation information IDG, and creates the excavation information database DB from the plurality of pieces of excavation information IDG in step S19. In generating the excavation information database DB, orders of steps S12 and S13, and steps S14 and S15 may be switched.

Figure 23:
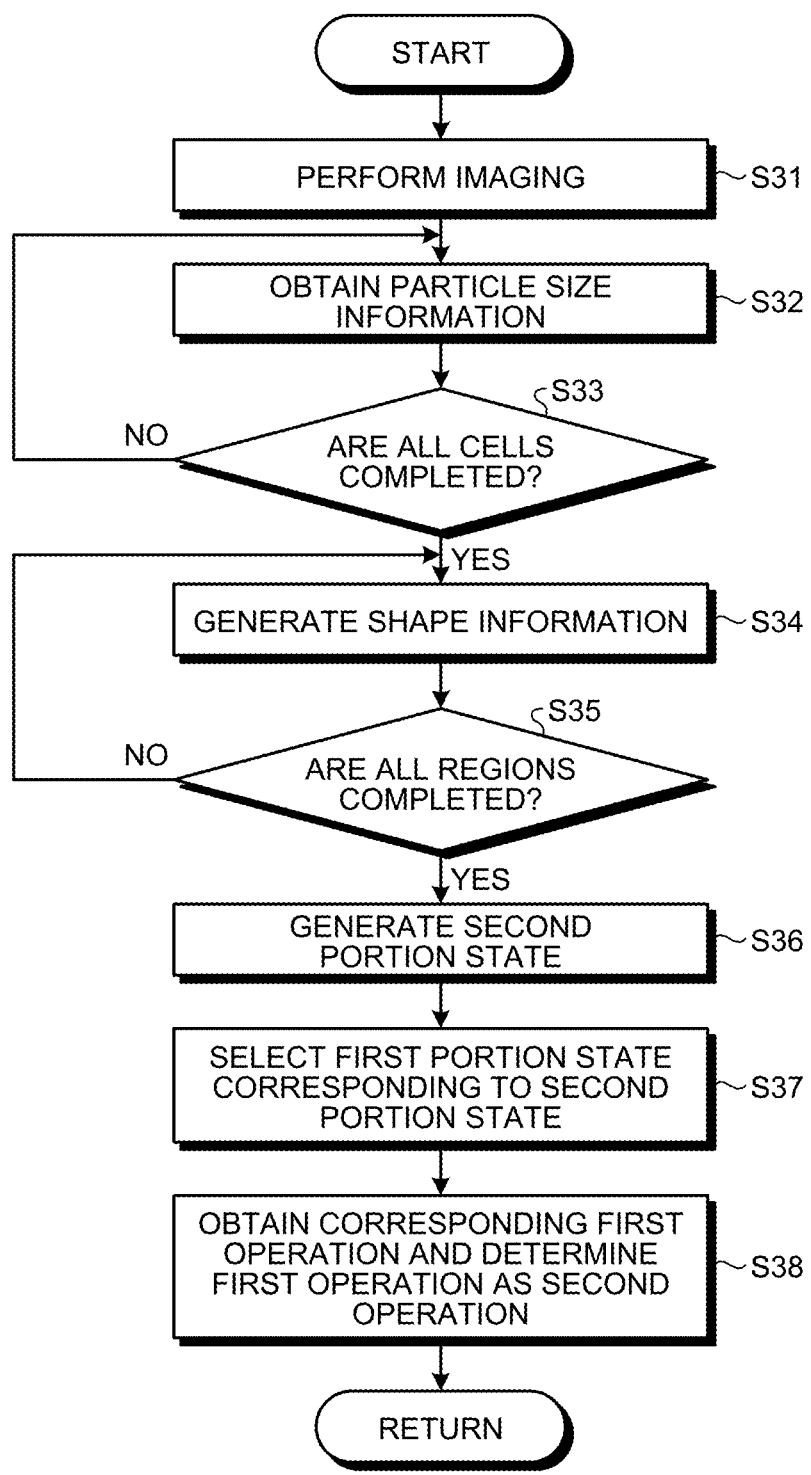
FIG. 23 is a flowchart illustrating an example of a procedure of determining a second operation.

FIG. 23 is a flowchart illustrating an example of a procedure of determining the second operation. In determining the second operation ICp, in step S31, the front detection device 40C images the second portion RMp. In step S32, the estimation unit 76A of the processing device 76 obtains the particle size information EG about respective cells included in the image PCI of the second portion RMp. In step S33, in a case where the particle size information EG has not yet been obtained about all the cells of the image PCI (step S33, No), the estimation unit 76A returns to step S32, and obtains the particle size information EG.

When the particle size information EG has been obtained about all the cells (step S33, Yes), the estimation unit 76A generates the shape information SP of the second portion RMp in step S34. In step S35, in a case where the shape information SP has not yet been generated about all the regions of the image PCI (step S35, No), the estimation unit 76A returns to step S34, and generates the shape information SP. When the shape information SP has been generated about all the regions of the image PCI (step S35, Yes), the processing device 76 advances the processing to step S36.

In step S36, the estimation unit 76A generates the second portion state IMp, using the particle size information EG and the shape information SP. Next, in step S37, the operation determining unit 76B refers to the excavation information database DB, and selects the first portion state IMt corresponding to the second portion state IMp. In step S38, the operation determining unit 76B obtains the first operation ICt corresponding to the first portion state IMt selected in step S37, and determines the obtained first operation ICt as the second operation ICp. In determining the second operation ICp, orders of steps S32 and S33, and steps S34 and S35 may be switched. Next, processing of updating the excavation information database DB will be described.

<Update of Excavation Information>

Figures 1, 24:
Figures 2, 24:

FIG. 24-1 is a diagram illustrating an example of an excavation information database DBa including an actual excavation quantity IQp. FIG. 24-2 is a diagram illustrating an example of an excavation information database DBb including the second operation. The excavation information database DBa includes a plurality of pieces of excavation information IDGa in which the first portion state IMt, the first operation ICt, and the actual excavation quantity IQp of when the excavation device 30DM performs excavation with the determined second operation ICp are associated with one another.

The processing device 76 adds, to the excavation information database DBa, evaluation information for evaluating the excavation state of when the excavation device 30DM is operated with the second operation ICp determined by the operation determining unit 76B and performs excavation. In an embodiment, the evaluation information is the actual excavation quantity IQp of when the excavation device 30DM performs excavation with the determined second operation ICp. However, the evaluation information is not limited thereto. For example, the evaluation information may be energy required for excavation, pressure of a hydraulic system, a flow rate of the hydraulic system, a load of a motor, a total value of differences between command values and an actual locus of the position or the posture of the bucket 33, or the like. In the excavation information database DBa, the actual excavation quantity IQp is not described in an initial state, and is added only after the actual excavation quantity IQp occurs.

The processing device 76 obtains the actual excavation quantity IQp of when the excavation device 30DM is operated with the second operation ICp determined by the operation determining unit 76B and performs excavation. Then, the processing device 76 stores the actual excavation quantity IQp and the excavation information IDGa including the first operation ICt corresponding to the second operation ICp with which the actual excavation quantity IQp has been obtained to the storage device 77 in association with each other. That is, the processing device 76 newly adds the obtained actual excavation quantity IQp to the excavation information database DBa. The quantity of the rock MR excavated by the excavation device 30DM with the second operation ICp, that is, the actual excavation quantity IQp is detected by the load capacity detection device 13 provided in the carrying machine 10 illustrated in FIG. 1. The actual excavation quantity IQp detected by the load capacity detection device 13 is transmitted by the communication device 14 to the control device 75 of the excavation machine 30.

The actual excavation quantity IQp is stored in the excavation information database DBa every time the excavation device 30DM excavates the second portion RMp with the second operation ICp. The processing device 76 can find the excavation information IDGa that does not contribute to excavation with high productivity, on the basis of the actual excavation quantity IQp, and can give warning. In doing so, the processing device 76 can notify a manager or the like of the excavation information IDGa that can realize the excavation with high productivity.

To the excavation information database DBb, a new second operation ICg determined using the plurality of first operations ICt corresponding to the plurality of first portion states IMt is added as a new operation ICtad. Assume that, in a case where n (n is an integer of 1 or more) pieces of excavation information IDGb1, IDGb2, IDGb3, . . . , IDGbn are written in the excavation information database DBb, a new second operation ICgn+1 is obtained. In this case, the processing device 76 adds excavation information IDGbn+1 including the new second operation ICgn+1 determined from the plurality of first operations ICt, a state IMgn+1 of the second portion RMp before excavated with the second operation ICgn+1, and an actual excavation quantity IQpn+1 of when excavated with the second operation ICgn+1, as (n+1)th excavation information IDGb of the excavation information database DBb.

In this way, the new operation ICtad is added to the excavation information database DBb. Therefore, there is an advantage of an increase in options of the excavation information IDGb that can realize the excavation with high productivity. Next, an example of processing of when the excavation information database DBa or the excavation information database DBb is updated will be described.

Figure 25:
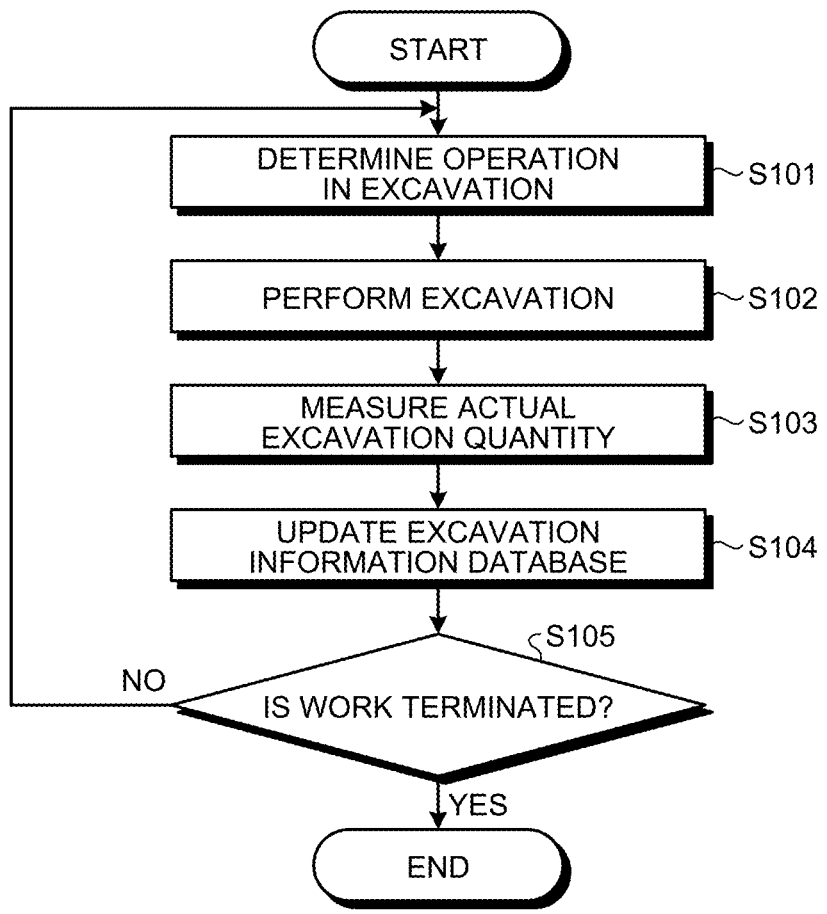
FIG. 25 is a flowchart illustrating an example of processing of updating excavation information or an excavation information database, using an excavation quantity.

FIG. 25 is a flowchart illustrating an example of processing executed when the excavation information database DBa or DBb is updated. When the excavation machine 30 excavates the second portion RMp, in step S101, the processing device 76 of the control device 75 illustrated in FIG. 4 determines the operation at the time of excavation, that is, the second operation ICp. In step S102, the excavation device 30DM excavates the second portion RMp with the second operation ICp. The excavated rock MR is conveyed by the feeder 31 illustrated in FIG. 1 and loaded into the vessel 11 of the carrying machine 10. In step S103, the load capacity detection device 13 of the carrying machine 10 measures the load capacity of the rock MR loaded in the vessel 11, that is, the actual excavation quantity IQp, and transmits the actual excavation quantity IQp to the control device 12.

The control device 12 transmits the actual excavation quantity IQp to the control device 75 of the excavation machine 30. The processing device 76 of the control device 75 that has acquired the actual excavation quantity IQp stores the actual excavation quantity IQp to the storage device 77. Next, in step S104, the update processing unit 76D of the processing device 76 updates the excavation information database DBa. To be specific, the update processing unit 76D adds the actual excavation quantity IQp to the excavation information IDGa including the first operation ICt corresponding to the second operation ICp with which the actual excavation quantity IQp has been obtained. When the excavation information database DBb is updated, the update processing unit 76D of the processing device 76 adds the excavation information IDGbn+1 including the new second operation ICgn+1, the state IMgn+1 of the second portion RMp before excavation, and the actual excavation quantity IQpn+1, as (n+1)th excavation information IDGb with description n+1 of the excavation information database DBb.

Next, in step S105, the processing device 76 determines whether the work has been terminated. When the work has not yet been terminated (step S105, No), the processing device 76 returns to step S101, and executes processing from step S101. When the work has been terminated (step S105, Yes), the control is terminated.

The operation determining unit 76B of the processing device 76 illustrated in FIG. 4 selects the first portion state IMt corresponding to the second portion state IMp on the basis of the degree of similarity to the second portion state IMp and the actual excavation quantity IQp, using the excavation information database DBa or the excavation information database DBb. The distance D between the second portion state IMp and the first portion state IMt used in this case is expressed by the formula (2), for example.

$$D = fk \times \sqrt{(IMp - IMtk)^2} \quad (2)$$

f is a correction factor calculation function by the evaluation information for evaluating the excavation state. In a case where the evaluation information is the actual excavation quantity IQp, f is expressed by the formula (3), for example. λ in the formula (3) is a coefficient. The sign k affixed to the correction factor calculation function f and the actual excavation quantity IQp indicates an integer of 1 or more, and calculation of a distance between the k-th element (learned data) of the excavation information database DBa or the excavation information database DBb and the second portion state IMp. The operation determining unit 76B can obtain the distance D, using the formulas (2) and (3) and select the first portion state IMt corresponding to the second portion state IMp, thereby to select the excavation information IDGa or the excavation information IDGb that can realize the excavation with high productivity.

$$fk = \lambda / IQpk \quad (3)$$

The actual excavation quantity IQp has been detected by the load capacity detection device 13 of the carrying machine 10. However, the device that detects the actual excavation quantity IQp is not limited to the load capacity detection device 13. For example, a load cell may be provided to the feeder 31 of the excavation machine 30 and detect the actual excavation quantity IQp, or the volume of the rock MR that passes through the feeder 31 may be detected with a scanner and used as the actual excavation quantity IQp.

<Case Where First Portion State IMt and Second Portion State IMp Include Color of Rock Mass RM>

Figure 26:
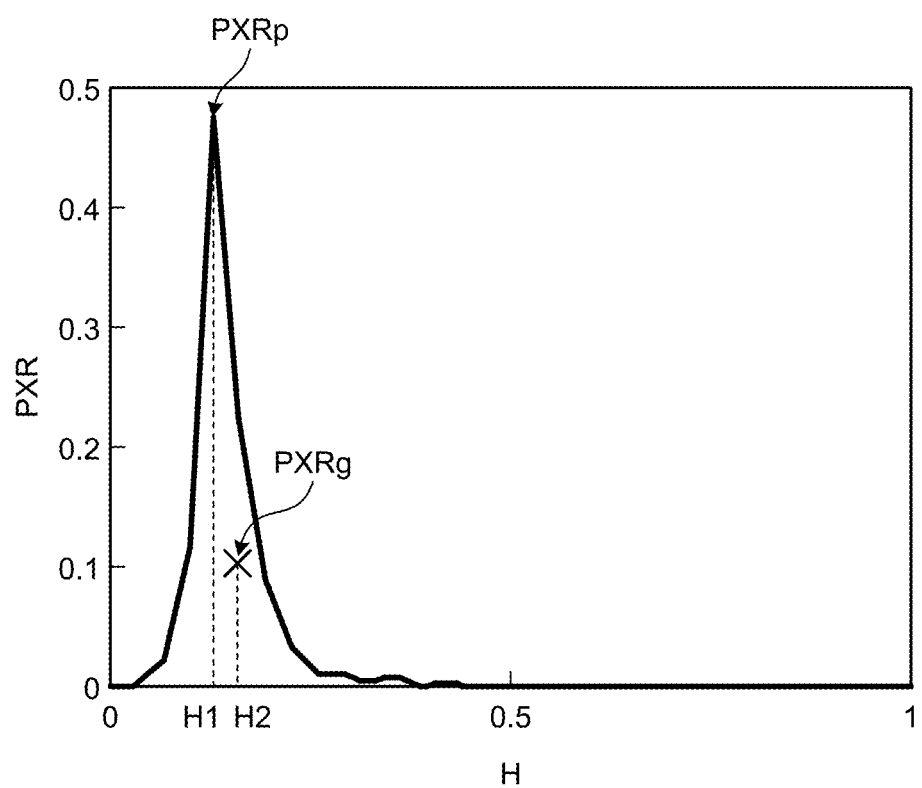
FIG. 26 is a diagram illustrating a relationship between hue and a pixel ratio of an image of a rock mass.

FIG. 26 is a diagram illustrating a relationship between hue H and a pixel ratio PXR of the image of the rock mass RM. In the above-described example, the particle size information EG and the shape information SP have been used as the first portion state IMt and the second portion state IMp. Here, an example of using the color of the rock mass RM will be described. In a case where the color of the rock mass RM is used as the first portion state IMt and the second portion state IMp, first, the image PCI of the rock mass RM, that is, the first portion RMt or the second portion RMp is acquired from the front detection device 40C as a color image. In an embodiment, the color image of the first portion RMt or the second portion RMp is expressed by HSV. However, the color image of the rock mass RM may be expressed by RGB or other methods.

The pixel ratio PXR of FIG. 26 is a ratio of the pixel with the hue H to all the pixels of any of the cells CL1 to CL9. That is, FIG. 26 illustrates a hue histogram of any one of the cells CL1 to CL9. The processing device 76 illustrated in FIG. 4 obtains a histogram peak PXRp or the center of gravity PHRg of hue for each of the cells CL1 to CL9 illustrated in FIG. 19. In the example illustrated in FIG. 26, hue H1 is the histogram peak PXRp and hue 2 is the center of gravity PHRg. The processing device 76 uses at least one of the histogram peak PXRp and the center of gravity PHRg, as the colors of the cells CL1 to CL9.

When the colors of the cells CL1 to CL9 have been obtained, color distribution of the first portion RMt or the second portion RMp can be obtained. The color distribution of the first portion RMt or the second portion RMp becomes the first portion state IMt and the second portion state IMp.

<Modification of Method of Generating Excavation Information>

Figure 27:
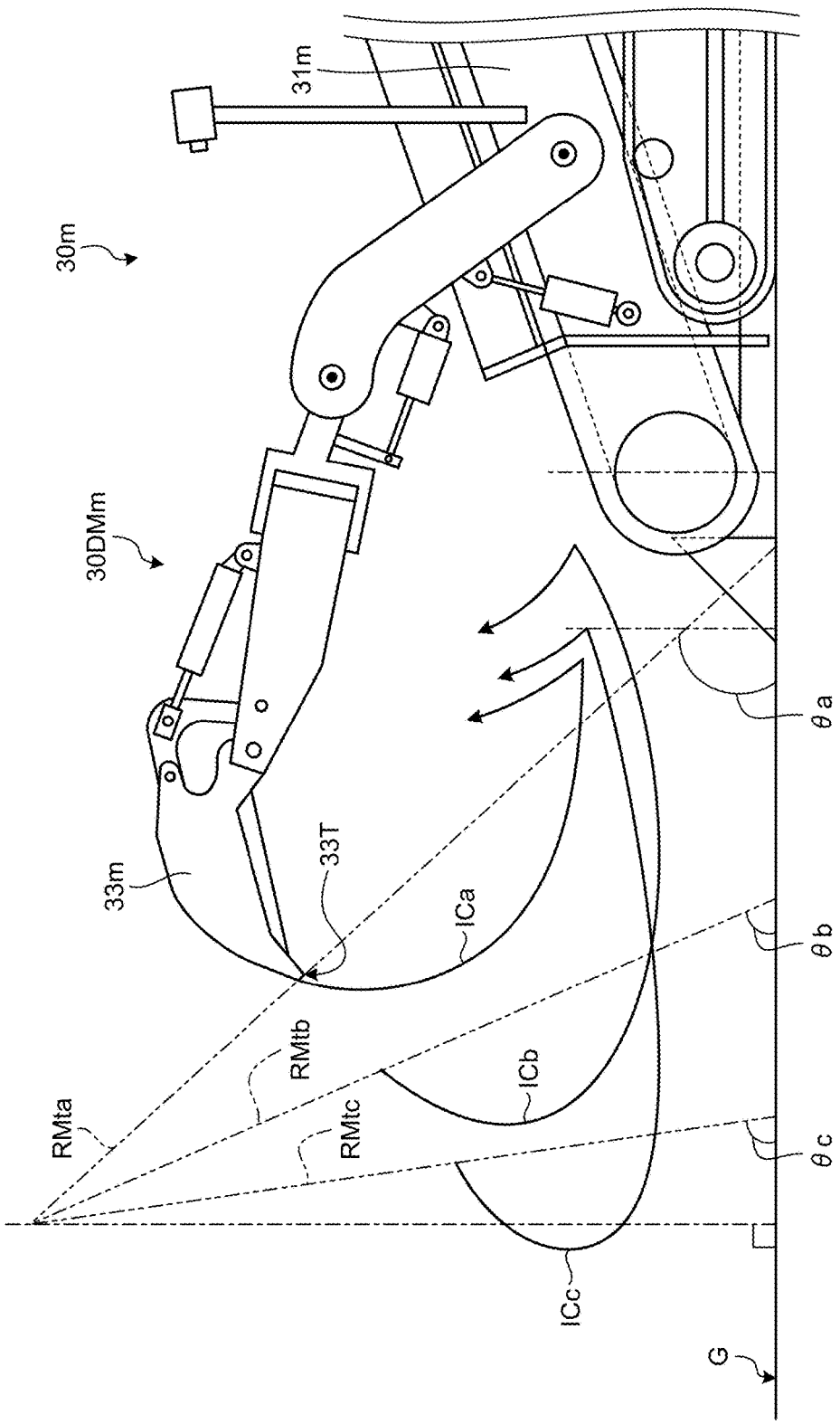
FIG. 27 is a diagram illustrating a modification of a method of generating excavation information.

FIG. 27 is a diagram illustrating a modification of a method of generating excavation information. In the present modification, a first operation ICt is obtained by execution of numerical value simulation by a computer, using models RMta, RMtb, RMtc of a first portion, a model 30m of an excavation machine, and a model 30DMm of an excavation device. For the numerical value simulation, a finite element method or a boundary element method can be used, for example. The model 30DMm of the excavation device is an example of a learning excavation device.

Inclination angles θa, θb, and θc with respect to a ground G are respectively set to the models RMta, RMtb, and RMtc of the first portion. In addition, the above-described particle size information EG is set to the models RMta, RMtb, and RMtc of the first portion RMt. Shape information SP is set using distances between outer edges of the models RMta, RMtb, and RMtc of the first portion, and a front detection device 40C, illustrated by the two-dot chain lines in FIG. 27. Models of rock according to the particle size distribution are set to the models RMta, RMtb, and RMtc of the first portion.

For the model 30m of the excavation machine and the model 30DMm of the excavation device, the specifications of the excavation machine 30 and the excavation device 30DM illustrated in FIG. 1 are modeled, and the model 30m of the excavation machine and the model 30DMm of the excavation device can be operated on the computer. In a case of executing the numerical value simulation, loci ICa, ICb, and ICc of an edge 33T of a model 33m of a bucket are set to the respective models RMta, RMtb, and RMtc of the first portion. These loci are illustrated by the solid lines in FIG. 27.

Simulation is repeated while the locus ICa is varied, using, as evaluation criteria, whether the model 30DMm of the excavation device performs an operation without stop, an excavation quantity of that time, and whether the model 30DMm can move the rock to the model 31m of the feeder, when the edge 33T of the model 33m of the bucket is moved along the locus ICa to excavate the model RMta of the first portion RMt. As a result, the operation of when the appropriate locus ICa is obtained is employed as the first operation, and is associated with a state of the model RMta of the first portion at that time to create excavation information. As for the models RMtb and RMtc of the first portion, the excavation information is generated similarly to the model RMta of the first portion, while the loci ICb and ICc are varied.

This method does not need actual excavation, and is thus favorable when actual excavation cannot be performed in generating the excavation information. Further, as described above, by updating the excavation information or the excavation information database, using the actual excavation quantity IQp obtained in actual work and the operation of the actual excavation device 30DM of when the actual excavation quantity IQp is obtained, the excavation information can be improved to a more useful information.

<Excavation System>

Figure 28:
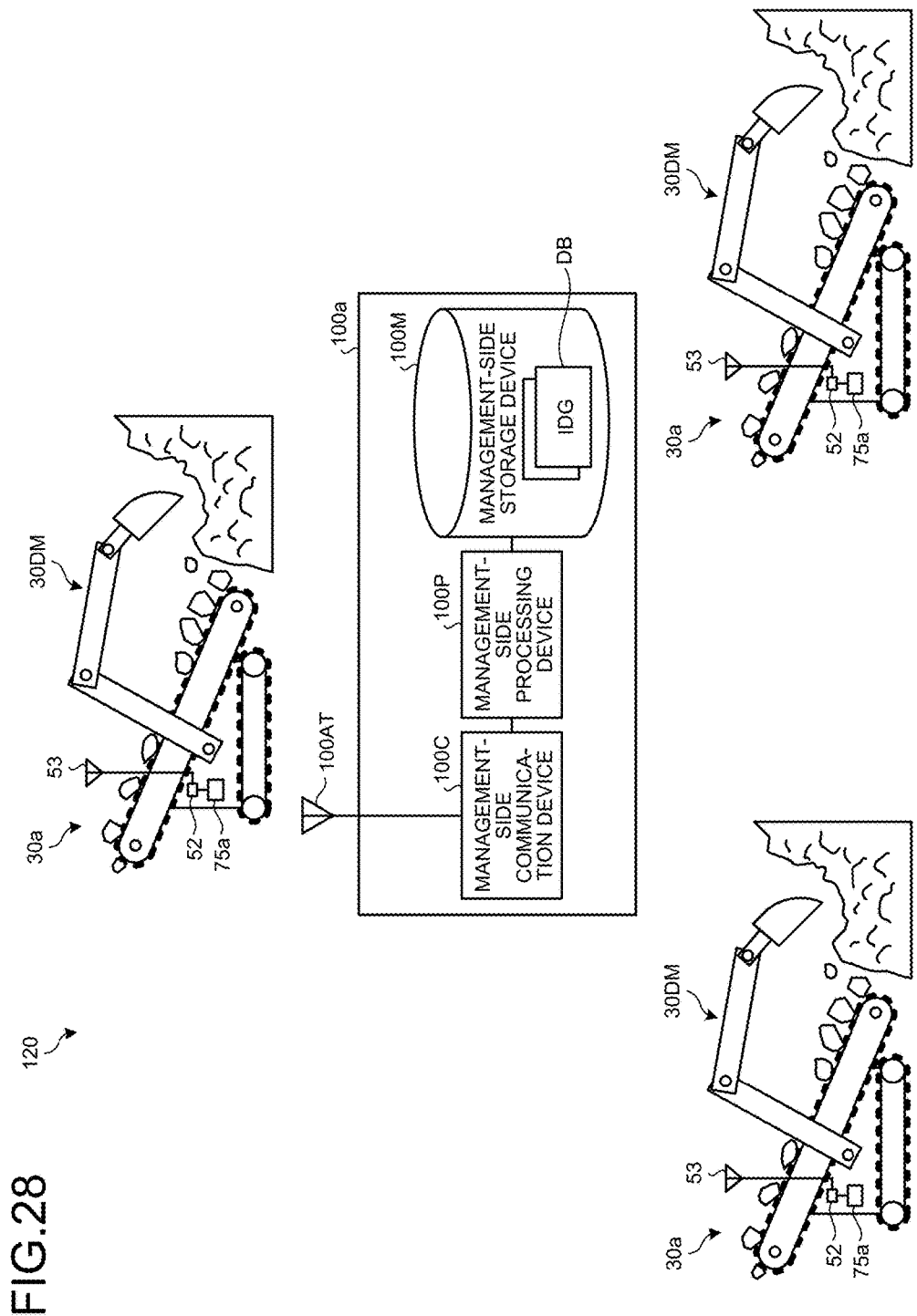
FIG. 28 is a diagram illustrating an example of an excavation system according to an embodiment.

FIG. 28 is a diagram illustrating an example of an excavation system 120 according to an embodiment. The excavation system 120 includes at least one excavation machine 30a and a management device 100a. The excavation machine 30a is similar to the excavation machine 30 illustrated in FIGS. 1 to 3 but a control device 75a is different. The control device 75a provided in the excavation machine 30a includes only the excavation control unit 76C of the processing device 76 of the control device 75 illustrated in FIG. 4, and does not include the estimation unit 76A, the operation determining unit 76B, and the update processing unit 76D. Further, the control device 75a provided in the excavation machine 30a does not store the excavation information database DB that is stored in the storage device 77 of the control device 75 illustrated in FIG. 4.

The management device 100a includes a management-side processing device 100P, a management-side storage device 100M, and a management-side communication device 100C. The management-side processing device 100P is a CPU, for example, and includes the estimation unit 76A, the operation determining unit 76B, and the update processing unit 76D of the processing device 76 of the control device 75 illustrated in FIG. 4. The management-side storage device 100M is a random access memory (RAM), a read only memory (ROM), a flash memory, or a hard disk drive, and stores the excavation information database DB that is stored in the storage device 77 of the control device 75 illustrated in FIG. 4. The management-side communication device 100C includes an antenna 100AT, and performs communication with the control device 75a through an antenna 53 of the excavation machine 30a and a communication device 52. The management-side storage device 100M may store an excavation information database DBa that stores evaluation information, in an embodiment, an actual excavation quantity IQp, or an excavation information database DBb that stores a new operation ICtad.

The management-side processing device 100P acquires second portion image information PCIp detected by the front detection device 40C of the excavation machine 30a and transmitted from the communication device 52 through the management-side communication device 100C. Then, the processing device 100P obtains a second portion state IMp from the acquired second portion image information PCIp. The management-side processing device 100P selects a first portion state IMt corresponding to the obtained second portion state IMp, from among first portion states IMt in the excavation information database DB stored in the management-side storage device 100M, and determines a first operation ICt corresponding to the selected state, as a second operation ICp. The management-side processing device 100P transmits information for operating the excavation device 30DM of the excavation machine 30a with the determined second operation ICp, to the control device 75a of the excavation machine 30a through the management-side communication device 100C The control device 75a of the excavation machine 30a operates the excavation device 30DM with the second operation ICp, using the information transmitted from the management device 100a. Further, the control device 75a of the excavation machine 30a transmits the evaluation information, in an embodiment, the actual excavation quantity IQp, to the management device 100a, in addition to the second portion image information PCIp.

The management-side processing device 100P acquires the actual excavation quantity IQp transmitted from the control device 75a of the excavation machine 30a, and updates the excavation information database DBa stored in the management-side storage device 100M. The management-side processing device 100P adds a new second operation ICg to the excavation information database DBb, when determining the second operation ICg, using a plurality of the first operations ICt corresponding to a plurality of the first portion states IMt. In this way, the management-side processing device 100P realizes the functions of the estimation unit 76A, the operation determining unit 76B, and the update processing unit 76D of the processing device 76 of the control device 75 illustrated in FIG. 4.

The function of the estimation unit 76A illustrated in FIG. 4 may be realized by the control device 75a of the excavation machine 30a. In this case, the control device 75a of the excavation machine 30a obtains the second portion state IMp from the second portion image information PCIp detected by the front detection device 40C, and transmits the second portion state IMp to the management device 100a. In doing so, the load of the management-side processing device 100P is decreased.

In the excavation system 120, the management device 100a collectively manages the excavation information databases DB, DBa, and DBb. Therefore, update of the excavation information databases DB, DBa, and DBb can be easily realized. Further, the excavation system 120 can add the evaluation information acquired from a plurality of the excavation machines 30a to the excavation information database DBa or DBb, or can add new second operations ICg obtained from the plurality of excavation machines 30a to the excavation information database DBb. Therefore, the management system 120 has an advantage of an increase in options of the excavation information IDGa and IDGb that can realize excavation with high productivity with high productivity.

The above-described configuration elements include elements easily conceived by a person skilled in the art, and substantially the same elements, so-called, elements within the scope of equivalents. Further, the above-described configuration elements can be appropriately combined. Further, various omissions, replacements, and changes of the configuration elements can be made without departing from the gist of the present embodiment.

REFERENCE SIGNS LIST

10 CARRYING MACHINE
20 OPERATION DEVICE
30 EXCAVATION MACHINE
30t LEARNING EXCAVATION MACHINE
30DM EXCAVATION DEVICE
30DMt LEANING EXCAVATION DEVICE
30BD BODY
31 FEEDER
32 SUPPORT MECHANISM
32a BOOM
32b ARM
32c CONNECTION MEMBER
32C1, 32C2, 32C3, and 32C4 HYDRAULIC CYLINDER
33 BUCKET
33B BLADE
33T EDGE
34 TRAVEL DEVICE
40C FRONT DETECTION DEVICE
40Ct LEARNING FRONT DETECTION DEVICE
48 DRIVE CONTROL DEVICE
75 and 75a CONTROL DEVICE
76 PROCESSING DEVICE
76A ESTIMATION UNIT
76B OPERATION DETERMINING UNIT
76C EXCAVATION CONTROL UNIT
76D UPDATE PROCESSING UNIT
77 STORAGE DEVICE
85 HYDRAULIC PUMP
85V ELECTROMAGNETIC CONTROL VALVE
100 and 100a MANAGEMENT DEVICE DB, DBa, and DBb EXCAVATION INFORMATION DATABASE
EDG EDGE
EG, EGA, and EGB PARTICLE SIZE INFORMATION
EQ, EQA, and EQB EDGE QUANTITY
EV, EVA, and EVB EDGE VARIATION
FT, FTA, FTB, and FTC STRUCTURAL ELEMENT
ICt FIRST OPERATION
ICp SECOND OPERATION
IDG, IDGa, and IDGb EXCAVATION INFORMATION
IMt FIRST PORTION STATE
IMp SECOND PORTION STATE
IQp ACTUAL EXCAVATION QUANTITY
MR ROCK
OP OPERATOR
PCI IMAGE
PEI, PEIA1, PEIA2, PEIA3, PEIB1, PEIB2, and PEIB3 EDGE IMAGE
RM, RMA, RMB, and RMC ROCK MASS
RMt FIRST PORTION
RMp SECOND PORTION
SP SHAPE INFORMATION

The invention claimed is:

1. An excavation machine comprising:
an excavation device provided with an excavation work tool;
a detection device that detects a state of an object to be excavated by the excavation device;
a storage device that stores a plurality of pieces of excavation information in which a state of a first portion that is a portion before excavated by a learning excavation device, and a first operation of when the learning excavation device excavates the first portion are associated with each other; and
a processing device including
an estimation unit that obtains a state of a second portion that is a portion intended to be excavated by the excavation device, the state having been detected by the detection device,
an operation determining unit that selects the state of the first portion corresponding to the state of the second portion obtained by the estimation unit, from among the states of the first portions of the plurality of pieces of excavation information, and determines the first operation corresponding to the selected state, as a second operation of when the excavation device excavates the second portion, and
an excavation control unit that operates the excavation device using the second operation determined by the operation determining unit,
wherein the object to be excavated by the excavation device is a rock mass including rock, and the state of the first portion and the state of the second portion included in the excavation information include at least one of information of particle size distribution of the rock, information of a shape of the rock mass, information of a color of the rock mass, and information of humidity of the rock mass, and
wherein the information of particle size distribution of the rock includes at least one of a quantity of edges extracted from an image of the first portion or the second portion imaged by an imaging device, and a ratio of variation of the quantity of edges to variation of a size of a structural element, the ratio having been obtained by changing the size of the structural element used in processing before the edge is extracted, and the information of a shape of the rock mass includes a distance between the imaging device and the rock mass.

2. The excavation machine according to claim 1, wherein the operation determining unit refers to the excavation information, and selects the state of the first portion on the basis of a degree of similarity to the state of the second portion obtained by the estimation unit.

3. The excavation machine according to claim 1, wherein the operation determining unit refers to the excavation information, selects the states of the plurality of first portions on the basis of a degree of similarity to the state of the second portion obtained by the estimation unit, and determines the second operation, using the plurality of first operations corresponding to the respective selected states of the first portions.

4. The excavation machine according to claim 3, wherein the processing device stores, to the storage device, the determined second operation together with the second portion.

5. The excavation machine according to claim 1, wherein the processing device stores, to the storage device, evaluation information for evaluating an excavation state of when the excavation device is operated using the second operation determined by the operation determining unit to perform excavation, in association with the excavation information including the first operation corresponding to the second operation.

6. The excavation machine according to claim 1, wherein the first operation is an operation of when an operator operates the excavation device to perform excavation.

7. A method of controlling an excavation machine, the method comprising:
in controlling an excavation machine including an excavation device and a detection device that detects a state of an object to be excavated by the excavation device,
generating a plurality of pieces of excavation information in which a state of a first portion that is a portion before excavated by a learning excavation device, and a first operation of when the learning excavation device excavates the first portion are associated with each other;
obtaining a state of a second portion that is a portion intended to be excavated by the excavation device;
selecting the state of the first portion on the basis of a degree of similarity to the state of the second portion, from among the states of the first portions of the plurality of pieces of excavation information, and determining the first operation corresponding to the selected state, as a second operation of when the excavation device excavates the second portion; and
operating the excavation device using the determined second operation,
wherein the object to be excavated by the excavation device is a rock mass including rock, and the state of the first portion and the state of the second portion included in the excavation information include at least one of information of particle size distribution of the rock, information of a shape of the rock mass, information of a color of the rock mass, and information of humidity of the rock mass, and
wherein the information of particle size distribution of the rock includes at least one of a quantity of edges extracted from an image of the first portion or the second portion imaged by an imaging device, and a ratio of variation of the quantity of edges to variation of a size of a structural element, the ratio having been obtained by changing the size of the structural element used in processing before the edge is extracted, and the information of a shape of the rock mass includes a distance between the imaging device and the rock mass.

8. The method of controlling an excavation machine according to claim 7, wherein
the first operation is an operation of when an operator operates the excavation device to perform excavation.

9. An excavation system comprising:
an excavation machine including
an excavation device provided with an excavation work tool,
a detection device that detects a state of an object to be excavated by the excavation device, and
a control device that operates the excavation device; and
a management device including
a storage device that stores a plurality of pieces of excavation information in which a state of a first portion that is a portion before excavated by a learning excavation device, and a first operation of when the learning excavation device excavates the first portion are associated with each other, and
a processing device that obtains a state of a second portion that is a portion intended to be excavated by the excavation device, the state having been detected by the detection device,
selects the state of the first portion corresponding to the state of the second portion, from among the states of the first portions of the plurality of pieces of excavation information, and determines the first operation corresponding to the selected state, as a second operation of when the excavation device excavates the second portion, and
transmits information for operating the excavation device with the determined second operation to the control device,
wherein the object to be excavated by the excavation device is a rock mass including rock, and the state of the first portion and the state of the second portion included in the excavation information include at least one of information of particle size distribution of the rock, information of a shape of the rock mass, information of a color of the rock mass, and information of humidity of the rock mass, and
wherein the information of particle size distribution of the rock includes at least one of a quantity of edges extracted from an image of the first portion or the second portion imaged by an imaging device, and a ratio of variation of the quantity of edges to variation of a size of a structural element, the ratio having been obtained by changing the size of the structural element used in processing before the edge is extracted, and the information of a shape of the rock mass includes a distance between the imaging device and the rock mass.

10. The excavation system according to claim 9, wherein the processing device refers to the excavation information, and selects the state of the first portion on the basis of a degree of similarity to the state of the second portion obtained by the estimation unit.

11. The excavation system according to claim 9, wherein the processing device refers to the excavation information, selects the states of the plurality of first portions on the basis of a degree of similarity to the obtained state of the second portion, and determines the second operation, using the plurality of first operations corresponding to the respective selected states of the first portions.

12. The excavation system according to claim 11, wherein the processing device stores, to the storage device, the determined second operation.

13. The excavation system according to claim 9, wherein the processing device stores, to the storage device, evaluation information for evaluating an excavation state of when the excavation device is operated with the second operation to perform excavation, in association with excavation information including the first operation corresponding to the second operation.

14. The excavation system according to claim 9, wherein the first operation is an operation of when an operator operates the excavation device to perform excavation.

* * * * *